United States Patent
Gray et al.

(10) Patent No.: US 8,220,221 B2
(45) Date of Patent: *Jul. 17, 2012

(54) SYSTEM AND METHOD FOR FLOOR COVERING INSTALLATION

(75) Inventors: Keith N. Gray, Marietta, GA (US);
Connie D. Hensler, Kennesaw, GA (US); Chung-Hsien Zah, Kennesaw, GA (US); Susan F. Fezer, Grantville, GA (US); Horace Eddie Bradley, Jr., LaGrange, GA (US)

(73) Assignee: Interface, Inc., Atlanta, GA (US)

( * ) Notice: Subject to any disclaimer, the term of this patent is extended or adjusted under 35 U.S.C. 154(b) by 307 days.

This patent is subject to a terminal disclaimer.

(21) Appl. No.: 12/702,509

(22) Filed: Feb. 9, 2010

(65) Prior Publication Data

US 2010/0176189 A1    Jul. 15, 2010

Related U.S. Application Data

(63) Continuation of application No. 12/056,916, filed on Mar. 27, 2008, which is a continuation-in-part of application No. 11/018,947, filed on Dec. 21, 2004, now Pat. No. 7,464,510, and a continuation-in-part of application No. 11/251,733, filed on Oct. 17, 2005, now Pat. No. 7,721,502, said application No. 11/018,947 is a continuation-in-part of application No. 10/638,878, filed on Aug. 11, 2003, now abandoned.

(60) Provisional application No. 60/920,368, filed on Mar. 27, 2007, provisional application No. 60/619,340, filed on Oct. 15, 2004, provisional application No. 60/690,762, filed on Jun. 15, 2005.

(51) Int. Cl.
*E04B 1/00* (2006.01)

(52) U.S. Cl. ........... 52/747.11; 52/515; 52/516; 52/385; 52/391; 156/298; 428/97; 340/944

(58) Field of Classification Search ............ 52/385, 52/391, 745.05, 747.11, 516, 515, 741.3, 52/741.4; 428/101; 156/304.5, 298; 340/944
See application file for complete search history.

(56) References Cited

U.S. PATENT DOCUMENTS 406,866 A    7/1889    Atwater
(Continued)

FOREIGN PATENT DOCUMENTS

AT    360217    12/1980
(Continued)

OTHER PUBLICATIONS

"CN200580042610.7, Decision on Granting of Patent Right and allowed claims", issued May 8, 2009.
(Continued)

*Primary Examiner* — William Gilbert
*Assistant Examiner* — Chi Q Nguyen
(74) *Attorney, Agent, or Firm* — Kilpatrick Townsend & Stockton LLP

(57) ABSTRACT

Connectors for joining adjacent modular floor covering units. Embodiments of the connectors include a film and an adhesive layer coated on one side of the film. The connectors can have a conductive component that allows electrical continuity to be maintained between adjacent tiles. In yet another embodiment, the connectors can be equipped as radio frequency identification tags by including radio frequency transponders. To install tiles using the connectors, a first tile is placed on the floor and a connector is positioned so that the adhesive layer faces upward and does not contact the floor. The connector is typically positioned so that only a portion of the adhesive layer adheres to the underside of the tile, leaving the remainder of the connector extending from the underside of the tile. One or more tiles are then positioned adjacent the first tile so that a portion of the connector adheres to the adjacent tiles. In this way, the connectors span adjacent tile edges. The tiles are assembled on an underlying flooring surface without the need to attach them to the floor surface. Rather, the tiles are linked to each other with the connectors, so that the tiles create a floor covering that "floats" on the underlying floor surface. Additionally, the tiles need not be installed directly on the floor surface. Rather, an underlayment, such as a film or cushion or cushion composite, may be positioned on the floor surface prior to the installation of tiles.

17 Claims, 17 Drawing Sheets

U.S. PATENT DOCUMENTS

| | | |
|---|---|---|
| 1,685,362 A | 9/1928 | Joseph |
| 1,711,149 A | 4/1929 | Joseph |
| 2,250,669 A | 7/1941 | Jamgotchian |
| 2,367,536 A | 1/1945 | Spitzli |
| 2,522,114 A | 5/1949 | Reinhard |
| 2,702,919 A | 3/1955 | Judge |
| 2,726,419 A | 12/1955 | Saks et al. |
| 3,083,393 A | 4/1963 | Nappi |
| 3,120,083 A | 2/1964 | Dahlberg et al. |
| 3,241,662 A | 3/1966 | Robinson et al. |
| 3,271,217 A | 9/1966 | Mapson |
| 3,494,006 A | 2/1970 | Brumlik |
| 3,538,536 A | 11/1970 | Pecorella |
| 3,558,384 A | 1/1971 | Ronning |
| 3,558,385 A | 1/1971 | Ronning |
| 3,558,386 A | 1/1971 | Ronning |
| 3,696,459 A | 10/1972 | Kucera et al. |
| 3,712,845 A | 1/1973 | Hartung |
| 3,748,211 A | 7/1973 | Hoopengardner |
| 3,788,941 A | 1/1974 | Kupits |
| 3,819,773 A | 6/1974 | Pears |
| 3,858,269 A | 1/1975 | Sutton et al. |
| 3,928,690 A | 12/1975 | Settineri et al. |
| 2,969,564 A | 7/1976 | Carder |
| 4,012,544 A | 3/1977 | Richards |
| 4,114,346 A | 9/1978 | Kelly |
| 4,152,473 A | 5/1979 | Layman |
| 4,196,254 A | 4/1980 | Puskadi |
| 4,242,389 A | 12/1980 | Howell |
| 4,322,516 A | 3/1982 | Wiest et al. |
| 4,340,633 A | 7/1982 | Robbins, Jr. |
| 4,489,115 A | 12/1984 | Layman et al. |
| 4,557,774 A | 12/1985 | Hoopengardner |
| 4,561,232 A | 12/1985 | Gladden, Jr. et al. |
| 4,562,938 A | 1/1986 | Loder |
| 4,564,546 A | 1/1986 | Jones |
| 4,571,363 A | 2/1986 | Culbertson et al. |
| 4,680,209 A | 7/1987 | Zybko et al. |
| 4,695,493 A | 9/1987 | Friedlander et al. |
| 4,702,948 A | 10/1987 | Sieber-Gadient |
| 4,769,895 A | 9/1988 | Parkins |
| 4,822,658 A | 4/1989 | Pacione |
| 4,824,498 A | 4/1989 | Goodwin et al. |
| 4,920,720 A | 5/1990 | LaBianca |
| 4,947,602 A | 8/1990 | Pollasky |
| 4,988,551 A | 1/1991 | Zegler |
| 5,012,590 A | 5/1991 | Wagner et al. |
| 5,018,235 A | 5/1991 | Stamatiou et al. |
| 5,034,258 A | 7/1991 | Grace |
| 5,096,764 A | 3/1992 | Terry et al. |
| 5,114,774 A | 5/1992 | Maxim, Jr. |
| 5,116,439 A | 5/1992 | Raus |
| 5,120,587 A | 6/1992 | McDermott, III et al. |
| 5,191,692 A | 3/1993 | Pacione |
| 5,205,091 A * | 4/1993 | Brown .................. 52/126.6 |
| 5,217,522 A | 6/1993 | Riebel et al. |
| 5,217,552 A | 6/1993 | Miyajima et al. |
| 5,304,410 A | 4/1994 | Webster |
| 5,401,547 A | 3/1995 | Blackwell et al. |
| 5,422,156 A | 6/1995 | Billarant |
| 5,438,809 A | 8/1995 | Ehrlich |
| 5,447,004 A | 9/1995 | Vrnak |
| 5,522,187 A | 6/1996 | Bogaerts |
| 5,564,251 A | 10/1996 | Van Bers |
| 5,609,933 A | 3/1997 | Stepanek |
| 5,634,309 A | 6/1997 | Polen |
| 5,672,404 A | 9/1997 | Callahan, Jr. et al. |
| 5,683,780 A | 11/1997 | Rodger et al. |
| 5,691,027 A | 11/1997 | Eckhardt et al. |
| 5,706,623 A | 1/1998 | Brown |
| 5,822,828 A | 10/1998 | Berard et al. |
| 5,834,081 A | 11/1998 | Fanti |
| 5,863,632 A | 1/1999 | Bisker |
| 5,888,335 A | 3/1999 | Kobe et al. |
| 5,931,354 A | 8/1999 | Braud et al. |
| 5,958,540 A | 9/1999 | Berard et al. |
| 5,995,884 A | 11/1999 | Allen |
| 6,068,904 A | 5/2000 | Stearns |
| 6,083,596 A | 7/2000 | Pacione |
| 6,093,469 A | 7/2000 | Callas |
| 6,253,526 B1 | 7/2001 | Murphy et al. |
| 6,260,326 B1 | 7/2001 | Muller-Hartburg |
| 6,306,477 B1 | 10/2001 | Pacione |
| 6,333,073 B1 | 12/2001 | Nelson et al. |
| 6,426,129 B1 | 7/2002 | Kalwara et al. |
| 6,475,594 B2 | 11/2002 | Johnston et al. |
| 6,599,599 B1 | 7/2003 | Buckwater et al. |
| 6,694,682 B2 | 2/2004 | Fanti |
| 6,701,685 B2 | 3/2004 | Rippey |
| 6,756,100 B2 | 6/2004 | Pearson et al. |
| 6,756,102 B1 | 6/2004 | Galo |
| 6,803,090 B2 | 10/2004 | Castiglione et al. |
| 6,850,024 B2 | 2/2005 | Peless et al. |
| 6,861,118 B2 | 3/2005 | Kobayashi et al. |
| 6,888,459 B2 | 5/2005 | Stilp |
| 6,908,656 B2 | 6/2005 | Daniel |
| 6,977,579 B2 * | 12/2005 | Gilfix et al. ................. 340/407.1 |
| 6,984,952 B2 | 1/2006 | Peless et al. |
| 7,039,522 B2 | 5/2006 | Landau |
| 7,148,803 B2 | 12/2006 | Bandy |
| 7,225,980 B2 | 6/2007 | Ku |
| 7,242,303 B2 | 7/2007 | Patel |
| 7,245,215 B2 | 7/2007 | Gollu |
| 7,339,523 B2 | 3/2008 | Bye |
| 7,464,510 B2 * | 12/2008 | Scott et al. ................. 52/506.05 |
| 7,672,780 B2 | 3/2010 | Kim |
| 7,721,502 B2 | 5/2010 | Scott et al. |
| 7,757,457 B2 | 7/2010 | Gray et al. |
| 2002/0140393 A1 | 10/2002 | Peless |
| 2003/0003263 A1 | 1/2003 | Smith |
| 2003/0071051 A1 | 4/2003 | Martinsen |
| 2004/0095244 A1 | 5/2004 | Conwell et al. |
| 2004/0185682 A1 | 9/2004 | Foulke |
| 2004/0258870 A1 | 12/2004 | Oakey et al. |
| 2005/0007057 A1 | 1/2005 | Peless |
| 2005/0059308 A1 | 3/2005 | Parsons |
| 2005/0089678 A1 | 4/2005 | Mead |
| 2005/0099291 A1 | 5/2005 | Landau |
| 2005/0099306 A1 | 5/2005 | Gilfix |
| 2005/0261571 A1 | 11/2005 | Willis |
| 2006/0048797 A1 | 3/2006 | Jung |
| 2006/0164236 A1 | 7/2006 | Siegl |
| 2006/0261951 A1 | 11/2006 | Koerner |
| 2006/0293794 A1 | 12/2006 | Harwig |
| 2007/0061075 A1 | 3/2007 | Kim |
| 2007/0069021 A1 | 3/2007 | Elrod |
| 2007/0126634 A1 | 6/2007 | Bye |
| 2008/0213529 A1 | 9/2008 | Gray et al. |
| 2009/0094919 A1 | 4/2009 | Scott et al. |
| 2010/0024329 A1 | 2/2010 | Gray et al. |
| 2010/0251641 A1 | 10/2010 | Gallagher |
| 2011/0107720 A1 | 5/2011 | Oakey et al. |

FOREIGN PATENT DOCUMENTS

| | | |
|---|---|---|
| AU | 2005295322 B2 | 4/2006 |
| AU | 2011200866 A1 | 3/2011 |
| BR | PI 0313495-4 A | 7/2005 |
| BR | PI 0518165-8 A | 11/2008 |
| CA | 1287966 | 8/1991 |
| CA | 2421763 A1 | 3/2002 |
| CA | 2495101 A1 | 2/2004 |
| CA | 2583532 A1 | 4/2006 |
| CA | 2679004 A1 | 10/2008 |
| CN | 2116040 U | 9/1992 |
| CN | 101084350 A | 12/2007 |
| CN | ZL200580042610.7 | 9/2009 |
| CN | 101614066 A | 12/2009 |
| CN | 101646737 | 2/2010 |
| DE | 1913002 | 3/1970 |
| DE | 2027415 | 12/1971 |
| DE | 2304392 | 8/1973 |
| DE | 2649644 | 5/1978 |
| DE | 10001551 | 7/2001 |
| DE | 2011113 U1 | 10/2001 |
| DE | 102004007595 | 9/2005 |
| EP | 0017986 | 10/1980 |
| EP | 0044533 | 1/1982 |

| | | | |
|---|---|---|---|
| EP | 0237657 A1 | 9/1987 |
| EP | 0239041 A2 | 9/1987 |
| EP | 0942111 A | 9/1999 |
| EP | 1313079 | 5/2003 |
| EP | 2129735 | 12/2009 |
| EP | 2258908 | 12/2010 |
| EP | 2258908 A2 | 12/2010 |
| EP | 2258908 A3 | 12/2010 |
| EP | 2258909 A2 | 12/2010 |
| EP | 2258909 A3 | 12/2010 |
| EP | 2374855 A2 | 10/2011 |
| EP | 2374855 A3 | 10/2011 |
| EP | 2374856 A2 | 10/2011 |
| EP | 2374857 A2 | 10/2011 |
| EP | 2374856 A3 | 11/2011 |
| EP | 2374857 A3 | 11/2011 |
| FR | 1239859 | 7/1960 |
| FR | 2582210 | 11/1996 |
| FR | 2903707 | 1/2008 |
| GB | 1350767 | 4/1974 |
| GB | 2113993 | 8/1983 |
| GB | 2182961 | 5/1987 |
| GB | 2299019 | 9/1996 |
| GB | 2342040 | 4/2000 |
| GB | 2389075 | 12/2003 |
| HK | 1114890 | 4/2010 |
| JP | 55086714 | 6/1980 |
| JP | 55086714 A | 6/1980 |
| JP | H09279106 | 3/1990 |
| JP | 02-038152 | 8/1990 |
| JP | 5163825 | 6/1993 |
| JP | H5-163825 | 6/1993 |
| JP | 09209545 | 8/1997 |
| JP | 09209546 | 8/1997 |
| JP | 09-279106 | 10/1997 |
| JP | 09209546 A | 12/1997 |
| JP | 11270115 | 10/1999 |
| JP | 2000328759 | 11/2000 |
| JP | 2004-003191 A | 1/2004 |
| JP | 2005-538760 A | 12/2005 |
| JP | 2008-517190 A | 5/2008 |
| JP | 2010523841 | 7/2010 |
| JP | 2011-094478 A | 5/2011 |
| KR | 10-2007-0068368 A | 6/2007 |
| KR | 10-2010-0014594 A | 2/2010 |
| MX | PA03002223 A | 6/2003 |
| MX | 285845 | 4/2011 |
| NL | 1028881 | 4/2005 |
| WO | WO-9810688 | 3/1998 |
| WO | 9820330 A1 | 5/1998 |
| WO | WO-9835276 | 8/1998 |
| WO | WO-0047837 | 8/2000 |
| WO | 0075417 A1 | 12/2000 |
| WO | 0225004 A2 | 3/2002 |
| WO | 02025004 A3 | 7/2002 |
| WO | WO-2004016848 | 2/2004 |
| WO | 2004/016848 A3 | 5/2004 |
| WO | WO-2005071597 | 8/2005 |
| WO | WO-2005092632 | 10/2005 |
| WO | 2005/118273 A1 | 12/2005 |
| WO | WO-2005112775 | 12/2005 |
| WO | WO-2006044928 | 4/2006 |
| WO | WO-2006045819 | 5/2006 |
| WO | WO-2006065430 | 6/2006 |
| WO | WO-2006065839 | 6/2006 |
| WO | WO-2006066299 | 6/2006 |
| WO | WO-2006096431 | 9/2006 |
| WO | WO-2006116528 | 11/2006 |
| WO | WO-2006128783 | 12/2006 |
| WO | WO-2007002708 | 1/2007 |
| WO | WO-2007018523 | 2/2007 |
| WO | WO-2007033980 | 3/2007 |
| WO | WO-2007072389 | 6/2007 |
| WO | WO-2007081823 | 7/2007 |
| WO | 2007098925 A1 | 9/2007 |
| WO | 2008119003 A3 | 10/2008 |
| WO | WO-2008119003 | 10/2008 |
| WO | WO-2010118084 | 10/2010 |
| WO | 2010/144897 A1 | 12/2010 |
| WO | WO-2010144897 | 12/2010 |
| WO | 2010/118084 A3 | 3/2011 |

OTHER PUBLICATIONS

"EP Application No. 05812737.4, Response to Communication,", filed May 29, 2009.

"JP 09 209546 A (Inax Corp.) Aug. 12, 1997", Patent Abstracts of Japan, vol. 1997, No. 12 Dec. 25, 1997.

"JP 55 086714 A (Dantoo KK) Jun. 30, 1980", Patent Abstracts of Japan, vol. 004, No. 128 (M-031) Sep. 9, 1980.

"PCT/US2005/037507, PCT Search Report", May 31, 2006.

"PCT/US2008/058361, PCT Search Report", Nov. 7, 2008.

"WOLFF TFV Carpet Tile Connector, WOLFF GmbH", 1987.

El-Zabadani, Hicham et al., "A Mobile Sensor Platform Approach to Sensing and Mapping Pervasive Spaces and Their Contents", Mobile & Pervasive Computing Laboratory, CISE Dept., University of Florida, date unknown.

Breaking New Ground in Flooring, TacFast systems international website (www.tacfastsystems.com), downloaded on Mar. 3, 2004.

Carpet Bargains, Retrieved Apr. 10, 2006, http://web.archive.org/web/19990827025011/carpetbargains.com/index.htm Apr. 27, 2006.

European Application Serial No. 10180426.8, Extended European Search Report mailed Nov. 22, 2010.

U.S. Appl. No. 10/638,878, Office Action mailed Jan. 4, 2007.

U.S. Appl. No. 10/638,878, Office Action mailed Apr. 27, 2006.

U.S. Appl. No. 11/018,947, Non-Final Office Action mailed Apr. 19, 2007.

U.S. Appl. No. 11/018,947, Non-Final Office Action mailed Nov. 29, 2007.

U.S. Appl. No. 11/018,947, Notice of Allowance mailed Aug. 13, 2010.

U.S. Appl. No. 11/251,733, Non-Final Office Action mailed Aug. 31, 2009.

U.S. Appl. No. 11/251,733, Notice of Allowance mailed Jan. 11, 2010.

U.S. Appl. No. 12/056,916, Notice of Allowance mailed Apr. 26, 2010.

U.S. Appl. No. 12/270,129, Office Action mailed Sep. 2, 2009.

U.S. Appl. No. 12/270,129, Notice of Allowance mailed Aug. 29, 2010.

U.S. Appl. No. 12/573,960, Office Action mailed Oct. 4, 2010.

Japanese Patent Application No. 2007-537027, Office Action dated Sep. 14, 2010.

Mexican Patent Application No. MX/A/2007/004405, Office Action dated Oct. 27, 2010.

International Application No. PCT/US08/058361, International Preliminary Examination Report dated Oct. 8, 2009.

International Application No. PCT/US2010/038471, International Search Report dated Sep. 6, 2010.

"Merchandising. Merriam-Webster Online Dictionary", Retrieved Apr. 10, 2006, http://webster.com/dictionary/merchandising.

European Application No. 05812737.4, Office Action dated Nov. 19, 2009.

European Application No. 05812737.4, Office Action dated Nov. 28, 2008.

European Application No. 05812737.4, Office Action dated Nov. 15, 2010.

European Application No. 08744428.7, Office Action dated Jan. 13, 2011.

Canadian Application No. 2,583,532, Office Action dated Apr. 8, 2010.

Canadian Application No. 2,583,532, Office Action dated May 13, 2009.

Australian Application No. 2005295322, Office Action dated Feb. 3, 2010.

Chinese Application No. 200580042610.7, Office Action dated Aug. 15, 2008.

Chinese Application No. 200910164633.5, Office Action dated Sep. 9, 2010.

PCT/US2005/037507, International Preliminary Report on Patentability dated Apr. 26, 2007.

PCT/US2005/037507, International Search Report dated May 31, 2006.
PCT/US2005/037507, Written Opinion dated May 30, 2006.
PCT/US2010/030170, International Search Report and Written Opinion dated Jan. 5, 2011.
U.S. Appl. No. 12/573,960, Office Action mailed Mar. 7, 2011.
Canadian Application No. 2,583,532, Office Action mailed on Apr. 5, 2011, 2 Pages.
Chinese Application No. 200910164633.5, Office Action mailed on Oct. 8, 2010, 2 Pages.
"Office Action Mailed Aug. 9, 2011", Japanese patent Application No. 2007-537027.
"Request for Inter Partes Reexamination", Control No, 95/001,725 (Patent No, 7,464,510).
"Request for Inter Partes Reexamination", Control No. 95/001,726 (Patent No, 7,721,502).
Extended European Search Report, EP Application No. 10180493.8, Nov. 15, 2010, 5 pages.
Amendment and Response to Apr. 19, 2007 Office Action, U.S. Appl. No. 11/018,947, Jul. 19, 2007, 11 pages.
Communication Pursuant to Article 94(3) EPC, EP Application No. 10180426.8, Sep. 7, 2011, 4 pages.
Communication Pursuant to Article 96(2) EPC, EP Application No. 01977126.0, Oct. 30, 2006, 3 pages.
Communication Pursuant to Rule 69 EPC and Invitation Pursuant to Rule 70a(1) EPC, EP Application No. 10180426.8, Dec. 20, 2010, 2 pages.
Communication Pursuant to Rule 69 EPC and Invitation Pursuant to Rule 70a(1) EPC, EP Application No. 11172028.0, Nov. 7, 2011, 1 page.
Communication Pursuant to Rule 69 EPC and Rule70a(1)EPC, EP Application No. 11172023.1, Oct. 31, 2011, 2 pages.
Communication Pursuant to Rules 109 and 110 EPC, EP Application No. 03788382.4, Apr. 25, 2005, 2 pages.
Communication Pursuant to Rules 109 and 110 EPC, EP Application No. 01977126.0, May 9, 2003, 2 pages.
Communication Pursuant to Rules 161 and 162 EPC, EP Application No. 08744428.7, Nov. 3, 2009, 2 pages.
EP Communication Pursuant to Rule 69 EPC and Request to Correct Deficiencies, EP Application No. 111720314, Nov. 14, 2011, 2 pages.
EP Communication Rule 161(1) and 162 EPC, EP Application No. 107147282, Dec. 1, 2011, 2 pages.
EP Extended European Search Report, EP Application No. 111720314, Oct. 10, 2011, 3 pages.
EP Extended European Search Report, EP Application No. 11172023.1, Sep. 27, 2011, 6 pages.
Communication Pursuant to Article 94(3) EPC, EP Application No. 101804938, Nov. 10, 2011, 7 pages.
EP Rule 161(1) and 162 EPC Communication, EP Application No. 107147282, Dec. 1, 2011, 2 pages.
EP Summons to Attend Oral Proceedings, EP Application No. 058127374, Nov. 15, 2011, 4 pages.
EP Office Action, EP Application No. 10180426.8, Sep. 7, 2011, 4 pages.
Examination, Prior Art and Voluntary Amendment, Canadian Patent Application No. 2,583,532, Jan. 17, 2008, 14 pages.
Extended Search Report, EP Application No. 10180426.8, Nov. 17, 2010, 6 pages.
Extended Search Report, EP Application No. 111720280, Sep. 29. 2011, 6 pages.
Final Office Action, U.S. Appl. No. 12/573,960, Nov. 17, 2011, 11 pages.
Final Office Action, U.S. Appl. No. 10/638,878, Jan. 4, 2007, 7 pages.
First Office Action, Chinese Patent Application No. 2005800426107, Aug. 15, 2008, 18 pages.
First Office Action, Chinese Patent Application No. 2009101646335, May 10, 2010, 6 pages.
Fourth Office Action, Chinese Patent Application No. 2009101646335, Oct. 19, 2011, 3 pages [no translation available].
International Preliminary Examination Report, PCT/US2003/025120, Dec. 28, 2004, 7 pages.

International Preliminary Report on Patentability, PCT/US2005/037507, Apr. 17, 2007, 13 pages.
International Preliminary Report on Patentability, PCT/US2005/018587, Nov. 29, 2006, 4 pages.
International Preliminary Report on Patentability with Written Opinion, PCT/US2010/038471, Dec. 12, 2011, 7 pages.
International Search Report, PCT/US2003/025120, Apr. 5, 2004, 3 pages.
International Search Report and Written Opinion, PCT/US2005/18587, Sep. 9, 2005, 8 pages.
International Search Report, PCT/US2001/29313, Apr. 8, 2002, 4 pages.
Invitation to Pay Additional Fees, PCT/US2005/037507, Mar. 2, 2006, 9 pages.
Notice of Acceptance, Australian Application No. 2005295322, Nov. 23, 2010, 3 pages.
Notice of Allowance, Canadian Patent Application No. 2,583,532, Nov. 18, 2011, 1 page.
Notice of Allowance, Mexican Application No. MX/a/2007/004405, Feb. 24, 2011, 1 page [no translation available].
Notice of Allowance, U.S. Appl. No. 12/270,129, Oct. 17, 2011, 5 pages.
Notice of Allowance with Examiner's Amendment, U.S. Appl. No. 11/251,733, Jan. 11, 2010, 6 pages.
Notice of Publication of the Registration and Grant of a Standard Patent, Hong Kong Application No. 08104813.9, Apr. 1, 2010, 1 page.
Notice of Grant of Patent Right for Invention, Chinese Patent Application No. 2005800426107, May 8, 2009, 2 pages.
Office Action, U.S. Appl. No. 12/573,960, Mar. 7, 2011, 10 pages.
Office Action, Mexican Application No. MX/a/2007/004405, Oct. 6, 2010, 3 pages [no translation available].
Office Action, Canadian Patent Application No. 2,583,532, Apr. 8, 2010, 3 pages.
Office Action, U.S. Appl. No. 10/381,025, Jan. 24, 2007, 8 pages.
Office Action, U.S. Reexamination Control No. 95/001,726, Nov. 10, 2011, 32 pages.
Office Action, U.S. Reexamination Control No. 95/001,725, Nov. 10, 2011, 46 pages.
Communication Proceeding Pursuant to Article 96(1) and Rule 51 (1) EPC, EP Application No. 019771260, Jun. 8, 2006, 3 pages.
Response to Aug. 15, 2008 Office Action, Chinese Patent Application No. 2005800426107, Feb. 26, 2009, 27 pages [translation of claims only].
Response to Apr. 25, 2005 Rule 109 Communication, EP Application No. 03788382.4, May 24, 2005, 9 pages.
Response to Apr. 27, 2006 Office Action, U.S. Appl. No. 10/638,878, Oct. 24, 2006, 7 pages.
Response to Apr. 5, 2011 Office Action, Canadian Patent Application No. 2,583,532, Sep. 29, 2011, 8 pages.
Response to Apr. 8, 2010 Office Action, Canadian Patent Application No. 2,583,532, Oct. 7, 2010, 14 pages.
Response to Aug. 31, 2009 Office Action, U.S. Appl. No. 11/251,733, Oct. 22, 2009, 9 pages.
Response to Aug. 9, 2011 Office Action, Japanese Patent Application No. 2007-537027, Dec. 9, 2011, 9 pages.
Response to Feb. 3, 2010 Examination Report, Australian Patent Application No. 20050295322, Nov. 9, 2010, 17 pages.
Response to Mar. 7, 2011 Office Action, U.S. Appl. No. 12/573,960, Aug. 11, 2011, 11 pages.
Response to May 10, 2010 First Office Action, Chinese Patent Application Serial No. 2009101646335, Jul. 21, 2010, 9 pages [translation of claims only].
Response to May 13, 2009 Office Action, Canadian Patent Application Serial No. 2,583,532, Nov. 13, 2009, 18 pages.
Response to May 25, 2011 Third Office Action, Chinese Patent Application Serial No. 2009101646335, Aug. 9, 2011, 12 pages [translation of claims only].
Response to Oct. 19, 2011 Fourth Office Action, Chinese Patent Application Serial No. 2009101646335, Mar. 5, 2012, 16 pages [translation of claims only].
Response to May 9, 2003 Communication Pursuant to Rules 109 and 110 EPC, EP Application No. 019771260, Jun. 6, 2003, 5 pages.

Response to Nov. 15, 2010 Communication, EP Application No. 05812737.4, May 13, 2011, 17 pages.
Response to Nov. 15, 2010 Extended European Search Report, EP Application No. 10180493.8, Jun. 15, 2011, 55 pages.
Response to Nov. 28, 2007 Office Action, U.S. Appl. No. 11/018,947, Mar. 28, 2008, 15 pages.
Response to Oct. 4, 2010 Office Action, U.S. Appl. No. 12/573,960, Nov. 15, 2010, 9 pages.
Response to Oct. 6, 2010 Office Action, Mexican Patent Application No. MX/a/2007/004405, Dec. 9, 2010, 9 pages.
Response to Office Action, EP Application No. 058127374, May 13, 2011, 12 pages.
Response to Nov. 17, 2010 Communication Pursuant to Rule 62 EPC, EP Application No. 101804268, Jun. 15, 2011, 54 pages.
Response to Office Action, Japanese Patent Application No. 2007537027, Jan. 14, 2011, 8 pages [no translation available].
Response to Sep. 2, 2009 Office Action, U.S. Appl. No. 12/270,129, Oct. 26, 2009, 9 pages.
Response to Nov. 3, 2009 Communication Pursuant to Rule 161EPC, EP Application No. 08744428.7, Dec. 11, 2009, 6 pages.
Response to Sep. 9, 2010 Second Office Action, Chinese Patent Application No. 2009101646335, Oct. 14, 2010, 9 pages [translation of claims only].
Second Office Action, Chinese Patent Application No. 2009101646335, Sep. 9, 2010, 8 pages.
Summons to Attend Oral Proceedings Pursuant to Rule 115(1) EPC, EP Application No. 058127374, Nov. 15, 2011, 4 pages.
Supplemental Notice of Allowability, U.S. Appl. No. 12/270,129, Nov. 17, 2011, 2 pages.
Supplementary European Search Report, EP Application No. 01977126.0, May 18, 2006, 3 pages.
Third Office Action, Chinese Patent Application No. 2009101646335, May 25, 2011, 5 pages [no translation available].
Voluntary Amendment, Brazilian Patent Application No. PI0313495-4, Feb. 23, 2006, 16 pages.
Voluntary Amendment, Australian Patent Application No. 2003265409, Apr. 11, 2005, 20 pages.
Voluntary Amendment, Korean Application No. 1020077008403, Oct. 15, 2010, 44 pages.
Voluntary Amendment, Japanese Patent Application No. 2004-529303, Aug. 3, 2005, 5 pages.
Voluntary Amendment, Canadian Patent Application No. 2,495,101, Feb. 9, 2005, 6 pages.
Voluntary Amendment, Chinese Patent Application No. 2005800426107, Oct. 12, 2007, 9 pages.
Voluntary Amendment, Brazilian Patent Application No. PI0518165-8, Oct. 17, 2008, 90 pages.
Written Opinion, PCT/US2003/025120, Oct. 8, 2004, 6 pages.
Patent Owner's Response to Office Action in *Inter Partes* Reexamination with Exhibits A—J3, U.S. Reexamination Control No. 95/001,726, Mar. 9, 2012, 270 pages.
Patent Owner's Response to Office Action in *Inter Partes* Reexamination with Exhibits A—J3, U.S. Reexamination Control No. 95/001,725, Mar. 9, 2012, 280 pages.
Petition Under 37 C.F.R. § 1.91(a)(3) to Admit Non-Conforming Exhibits in an *Inter Partes* Reexamination, U.S. Reexamination Control No. 95/001,725, Mar. 9, 2012, 6 pages.
Supplemental Petition Under 37 C.F.R. § 1.183 to Exceed the Page Limit for Patent Owner's Response in an *Inter Partes* Reexamination, U.S. Reexamination Control No. 95/001,725, Mar. 9, 2012, 4 pages.
Petition Under 37 C.F.R. § 1.91(a)(3) to Admit Non-Conforming Exhibits in an *Inter Partes* Reexamination, U.S. Reexamination Control No. 95/001,726, Mar. 9, 2012, 6 pages.
Supplemental Petition Under 37 C.F.R. § 1.183 to Exceed the Page Limit for Patent Owners Response in an *Inter Partes* Reexamination, U.S. Reexamination Control No. 95/001,726, Mar. 9, 2012, 4 pages.

* cited by examiner

SYSTEM AND METHOD FOR FLOOR COVERING INSTALLATION

CROSS-REFERENCE TO RELATED APPLICATIONS

This application is a continuation of U.S. patent application Ser. No. 12/056,916 filed Mar. 27, 2008, which claims the benefit of U.S. Provisional Application No. 60/920,368 filed Mar. 27, 2007 and is a continuation in part of U.S. patent application Ser. No. 11/018,947 filed Dec. 21, 2004, issued as U.S. Pat. No. 7,464,510 and is a continuation-in-part of U.S. patent application Ser. No. 11/251,733 filed Oct. 17, 2005, issued as U.S. Pat. No. 7,721,502. U.S. patent application Ser. No. 11/018,947 filed on Dec. 21, 2004 claims the benefit of U.S. Provisional Application No. 60/619,340 filed Oct. 15, 2004 and is a continuation-in-part of U.S. patent application Ser. No. 10/638,878 filed on Aug. 11, 2003 now abandoned, which claims the benefit of U.S. Provisional Application No. 60/403,790 filed on Aug. 15, 2002. U.S. patent application Ser. No. 11/251,733 filed on Oct. 17, 2005 claims the benefit of U.S. Provisional Application No. 60/619,340 filed Oct. 15, 2004 and claims the benefit of U.S. Provisional Application No. 60/690,762 filed Jun. 15, 2005. The contents of all are incorporated herein by this reference.

FIELD OF THE INVENTION

Embodiments of this invention relate to systems and methods for installing floor coverings, particularly including carpet tile and other modular floor coverings.

BACKGROUND OF THE INVENTION

Floor coverings have been in use since before recorded human history. The first such materials were undoubtedly animal skins or plant materials like leaves or stems. Later, floor coverings were manufactured, such as by weaving or knotting a variety of naturally occurring fibers, including sisal and wool. Beginning in the twentieth century, such fiber-faced floor coverings began to be manufactured from man-made fibers as well.

While the first floor coverings were limited in size to the size of an animal skin, later floor coverings expanded to cover entire room floors. Such "wall-to-wall" installations of "broadloom" floor covering came into wide-spread use in the twentieth century. Paradigm installations of such materials utilize one or a small number of pieces of broadloom carpeting to cover entire room floors. This type of wall-to-wall floor covering is generally attached to the floor in some manner.

Later, modular floor coverings utilized smaller, uniform size modules or tiles in both solid surface floor coverings such as vinyl tiles and in textile-faced floor coverings, usually called carpet tiles. As explained in U.S. Patent Application Publication 2004/0258870 for "Re-Configurable Modular Floor Covering," filed Aug. 11, 2003 (incorporated by reference), tiles may be installed as area rugs that do not cover the entire flooring surface. However, the vast majority of tiles are used in wall-to-wall installations. Tiles have traditionally been installed in aligned rows and columns, with the edges of each tile aligned with the edges of adjacent tiles ("conventional carpet tile installation method"). Conventional carpet tile has historically been a product that sought to mimic the appearance of broadloom carpet and to hide or at least de-emphasize the fact that the product was modular. Achieving this result has required, at minimum, that carpet tiles or modules be placed in a flooring installation with the same orientation that the modules had at the time they were produced (i.e., monolithically). However, textile face modular flooring designers have recently begun to design flooring and flooring installations that do not seek to mask, but rather celebrate, the modularity of the flooring. For instance, while still installed in aligned rows and columns, modules are installed "quarter-turned" with each tile position rotated 90° relative to each adjacent tile. Moreover, carpet tiles have been developed that can be installed "randomly" without regard to position or rotational orientation as described in U.S. Pat. No. 6,908,656, which is incorporated herein by reference.

Modules are not always installed in aligned rows and columns, however. For example, tiles are also installed in aligned columns that do not form aligned rows of modules so that a column of tiles appears shifted up or down relative to adjacent tile columns ("ashlar installation method"). In other installations, tiles are installed in aligned rows that do not form aligned, but rather staggered, columns ("brick-laid installation method").

While the floor covering modules are generally of relatively substantial size and weight, which facilitates maintenance of the modules in the positions they are placed when the floor covering is assembled, it is desirable to provide a means for further resisting module movement. This has traditionally been accomplished by attaching the modules to the underlying flooring surface in a variety of ways.

Modules are often glued to the floor by first applying a layer of adhesive to the underlying flooring surface and then positioning the tiles on top of the adhesive. With this method, adhesive typically contacts the entire surface area of the underside of the flooring modules, which increases material costs and often leads to difficulty in re-positioning the tiles if they are positioned incorrectly. This is a particular problem during installation of patterned modules that must be matched at the seams. Moreover, when the tiles are eventually removed, glue remains on the flooring surface and that glue sometimes retains portions of the removed tiles. The glue (and any flooring materials held by the glue) must be removed from the floor to create a smooth surface before installing new tiles. This adds both cost and time to the installation process.

Modules may also be installed by pre-applying adhesive to the entire underside (or any part) of the module. For example, adhesive may be applied in a relatively narrow strip across each module underside and covered, prior to module installation, by a plastic film or paper strip that is peeled off just before module placement. Again, however, this method involves attaching the modules directly to the floor and can result in the consequent drawbacks discussed above.

Modules have also be installed using double-sided adhesive tape, whereby one side of the tape is positioned on the back of the module and the other side of the tape is positioned on the floor to thereby secure the module to the floor. Double-sided tape has also been positioned between and along the entirety of adjacent carpet and carpet tile edges. However, as with adhesive, double sided tape can be unforgiving with respect to tile re-positioning and can also leave a residue on the floor upon removal of the tiles. Moreover, the tape has a low tensile strength and is relatively inelastic and consequently is apt to stretch and not regain its shape. This can result in the gaps formed between adjacent tiles.

In addition to direct attachment to the floor, modules have also been indirectly attached to the underlying flooring surface, such as with mechanical fasteners or adhesive covered pads. For example, hook and loop fasteners have been used whereby a sheet of either the hook or the loop is secured to the floor and the other of the hook or the loop is provided on the back of the modules. The hook or loop on the modules then engages the hook or loop on the floor to secure the modules to the floor. Pads covered with adhesive have also been used. For example, a foam pad pre-coated on both sides with a releasable adhesive has been used. During installation, release paper is removed from both sides of the pad to expose the adhesive, and the pad is attached to the floor. Carpet tiles are then positioned on top of the pad and held in place by the adhesive. While these systems and methods may improve the installers' ability to re-position the tiles, they significantly increase the material cost of the installation. Moreover, with these installation methods, the tiles are more likely to move relative to each other and thereby create gaps in the installation.

Other installation methods exist whereby the tiles are neither directly nor indirectly attached to the floor. For example, one-sided adhesive tape, such as duct tape, has been used to secure adjacent tiles together. The tiles are positioned face down and the tape is secured along the entirety of the adjacent edges of the tiles. The tiles must then be carefully turned over to expose their wear surfaces without breaking the connection between adjacent tiles. This method requires a significant amount of time to position the tape on the tiles as well as a significant material investment to tape adjacent tile edges together along the entirety of the seams. Moreover, such adhesive tape is relatively flimsy, making it challenging to position the tape as desired on the underside of tiles, and, as with double-sided adhesive tape, suffers from low tensile strength and inelasticity, rendering it likely to permanently stretch when subjected to stress and thereby create permanent gaps between adjacent tiles.

Regardless of the method of installation, tiles are often inadvertently installed over surfaces that have a high moisture content and a high pH. If the carpet tile is installed directly over high-moisture content flooring, then an undesirable smell may result due to moisture trapped between the floor surface and the tile. Traditionally, to combat this problem, a sealant has been applied to the floor surface before adhering the tile to the floor.

Moreover, carpet tiles have been manufactured with a cushion backing, which is desirable for comfort. Traditionally, the cushion layer is attached directly to the carpet tile so that, if the carpet tile is later removed or replaced, the cushion is necessarily removed with the tile.

While methods for installing floorcoverings exist, a need exists for a system and method that reduces both the time and material costs needed to install modules into a stable floorcovering.

SUMMARY OF THE INVENTION

Embodiments of this invention addresses the problems of previous modular flooring installation methods by providing systems and methods that reduce the time and material costs required to install a floor covering. Connectors are used to join adjacent floor covering units. The connectors are particularly useful in installing modular floor covering units ("tiles"). In one embodiment, the connectors include a film and an adhesive layer coated on one side of the film. To install tiles using the connectors, a first tile is placed on the floor at a position determined by conventional tile installation methods. A connector is positioned so that the adhesive layer faces upward and does not contact the floor. The connector is typically positioned so that only a portion of the adhesive layer adheres to the underside of the tile, leaving the remainder of the connector extending from the underside of the tile. Tiles are then positioned adjacent the first tile so that a portion of the connector adheres to the adjacent tiles. In this way, the connectors span the adjacent edges of the adjacent tiles. The tiles are assembled on a underlying floor surface without the need to attach them to the floor surface. Rather, the tiles are linked to each other with the connectors, so that the tiles create a floor covering that "floats" on the underlying floor surface.

The connectors need not be positioned along the entirety of the adjacent edges nor even across all adjacent tiles edges in the installation. Rather, the connectors are sized so that, when positioned in the installation, they do not extend along the entire length of the adjacent edges. Moreover, while any number of connectors may be used at any number of locations between adjacent tiles, the benefits of this invention may be fully realized by placing the connectors in strategic locations within the assembly (such as at some of the corners where four tiles meet). This is in contrast to prior installation methods that required stabilizing material be placed along the entirety of adjacent tiles edges so that all adjacent tiles edges in the installation were stabilized.

The size and relatively minimal number of connectors needed to stabilize a tile installation can result in a significant reduction in material costs from prior tile installation methods. Moreover, use of the connectors significantly reduces tile installation time by obviating the need to prep a floor prior to installation. Instead of the installer applying a layer of adhesive to the floor and then retracing his steps to position the tiles on the adhesive layer, with the connectors, the installer positions and secures as he goes. Moreover, given the releasable adhesive used on the connectors and the limited surface area of the tiles that contacts the connectors, the tiles can easily be re-positioned if necessary. Furthermore, because the tiles do not interact with the underlying floor, they are easily removable from the floor and leave the underlying floor with little or no residual adhesive upon such removal. Consequently, the floor does not require refinishing before it is recovered with another floorcovering.

Additionally, the connectors can be adapted to conduct electricity. When the conductive connectors are secured to the tiles, electrical continuity is maintained through adjacent tiles. This makes it possible to conduct electricity through the tiles for use with security systems, voice and data transmission, electromechanical membranes, tracking and location monitoring, wayfinding (e.g., when a person walks on the floor, the floor is illuminated in some manner by which to assist the person to find his/her way), and many other alternatives.

Installation can be expedited through use of a dispenser that holds connectors and that preferably also produces individual connectors in a ready-to-grasp fashion. The dispenser may have a mechanism for separating the connectors from a release layer or from other connectors. The dispenser may be secured to an installer's belt and leg and may include connectors in a roll, connectors on a roll of release material, connectors on fan-folded release material, or individual connectors, as examples. The dispenser may be refillable or designed for single use.

Preferably the dispenser has a housing for release material in a strip bearing connectors at successive intervals along the length of the strip. The dispenser also has an opening for presenting connectors to the user and may also have an actuator for controlling the release and presentation of a connector through the opening to the user. The dispenser also may have one or more attachment members such as a belt loop or leg strap for securing the dispenser to the user. During carpet installation, the dispenser is secured to the carpet installer using an attachment member so that the installer may move around the room to install carpet tiles using the dispensed connectors. To acquire a connector, the carpet tile installer moves the actuator to cause a connector to be released from the release material and presented through the opening where it may be easily grasped. The connector may then be attached to one or more carpet tiles. Another embodiment provides a dispenser with a housing having an opening for connectors to exit and an actuator actuated by hand movement from a first position to a second position that is closer to a desired location on the floor surface and closer to the opening than the first position. The dispenser opening may be within hands reach of the second position of the actuator, so that a first portion of a user's hand can contact the opening and the same time a second portion of the user's hand contacts the actuator in its second position. This allows a user to easily grasp a connector presented from the opening after moving the actuator from the first position to the second position.

In another embodiment of the invention, a stack of connectors each having adhesive on one side are bonded or otherwise attached together. The individual connectors in the stack of connectors may be bonded or attached together in a variety of ways. For example, the adhesive on the adhesive side of one connector may be releasably attached to an adjacent connector's opposite side that may be coated with a release coating to prevent the adhesive from forming a permanent or hard-to-detach bond. Generally, the adjacent connectors in a stack are oriented in a similar direction and aligned. As another example, a release layer may separate the adjacent connectors, with the adhesive layer of a first connector attached to a release material and the opposite side of a second connector also attached to the release material. As yet another example, the stack of connectors may be successive connectors attached on a single strip of release material folded such that adjacent connectors on the strip overlap one another in the stack, i.e. fan folded release material. A stack of connectors may also be included within a dispenser that assists a user in removing an individual connector from the stack of connectors. During carpet installation, a carpet installer may use a stack of connectors by removing an individual connector from the stack and attaching it to the underside of the carpet edge.

Another embodiment of the invention provides a connector having a film with a layer of water-based or synthetic polymer-based adhesive on one side. The adhesive may have low or no volatile organic content and may be plasticizer resistant.

Another embodiment of the invention provides for an intermediate substrate between the connected tiles and the underlying flooring surface. For example, a film and/or cushion may be positioned on the floor prior to tile installation. The film and/or cushion is preferably moisture resistant and serves as a barrier to prevent moisture present in the existing floor from contacting the tiles. The film and/or cushion thus eliminates the need for traditional sealants and barrier coatings. The cushion additionally provides comfort underfoot and eliminates the need to use cushion back carpet tiles. Rather, hard back carpet tiles may be installed over the cushion to impart the desirable cushioning characteristics. If the tile becomes soiled or worn, it can be removed without removing the cushion. In this way, the cushion can remain on the floor and be reused.

Yet another embodiment of an intermediate substrate provides a cushion composite suitable for carpet-on-carpet installation, where new carpet tiles are placed on top of existing carpet tiles or wall-to-wall carpeting. The new tiles can be installed using the connectors described above. This embodiment provides for the temporary or permanent replacement of carpeting at reduced cost, as the current tiles or carpet need not be removed prior to installation of the new carpet tiles. Additionally, the new tiles can be removed without damage to the existing tiles or wall-to-wall carpeting.

Regardless of the type of intermediate substrate used (if any), in one embodiment all of tiles placed atop the intermediate substrate are connected together using the connectors disclosed herein. In this way, none of the layers in the installation are connected to any other layer in the installation (e.g., the intermediate substrate is not connected to the floor and the carpeting or tiles are not connected of the intermediate substrate). In this way, the flooring may be easily removed without requiring clean-up and preparation before installation a subsequent floorcovering.

The connector may have alignment indicia for facilitating installation of carpet tiles. Such indicia include markings, colors, and objects such as crosshairs, lines, dots, blocks, and multi-color segments and quadrants.

Another embodiment of the invention provides a method of installing carpet tile using connectors with adhesive on one side. An installer places a carpet tile in or near its desired installation position on a floor surface with the underside of the tile resting on the floor surface. The installer uses one hand to lift an edge, corner, or other portion of the tile and the other hand to attach a connector adhesive side up to the edge or other part of the underside of the portion of the tile such that an exposed portion of the connector extends beyond the edge of the tile. The installer then places a second tile adjacent the first and attaches the underside of the second tile to the exposed portion of the connector. A dispenser may provide the connector to the installer with the adhesive side up and in a location convenient to the portion of the carpet tile to which the connector is to be attached.

DETAILED DESCRIPTION OF THE DRAWINGS

Embodiments of this invention relate to systems and methods for installing floor covering. One of skill in the art will understand that the systems and methods described herein may be used in a variety of floor covering installations. However, applicants have found the connectors described herein particularly useful in any type installation (including wall-to-wall and area rug installations) of modular floor covering units (hereinafter referred to as "tiles"). The tiles may be of various colors and textures in a range of sizes and shapes. For example, individual tiles may be in a shape that simulates wood planking or shapes of ceramic and other tiles, including, but not limited to, hexagons, squares, rectangles, triangles and other shapes. In addition, the tiles may be provided in a variety of textures. Tiles of this invention may typically be conventional carpet tile with textile faces (including, but not limited to, tufted, bonded, and printed faces), but could also be other modular materials, including woven and nonwoven textile flooring, solid vinyl, ceramics, leather, or any other suitable material. The tiles are preferably installed on a generally smooth surface, including, but not limited to plywood, laminates, linoleum, vinyl tile, hardwoods, and concrete. However, as discussed below, the tiles may be installed on an intermediate substrate, including pad and broad loom carpet, located between the tiles and the underlying floor.

Figure 1:
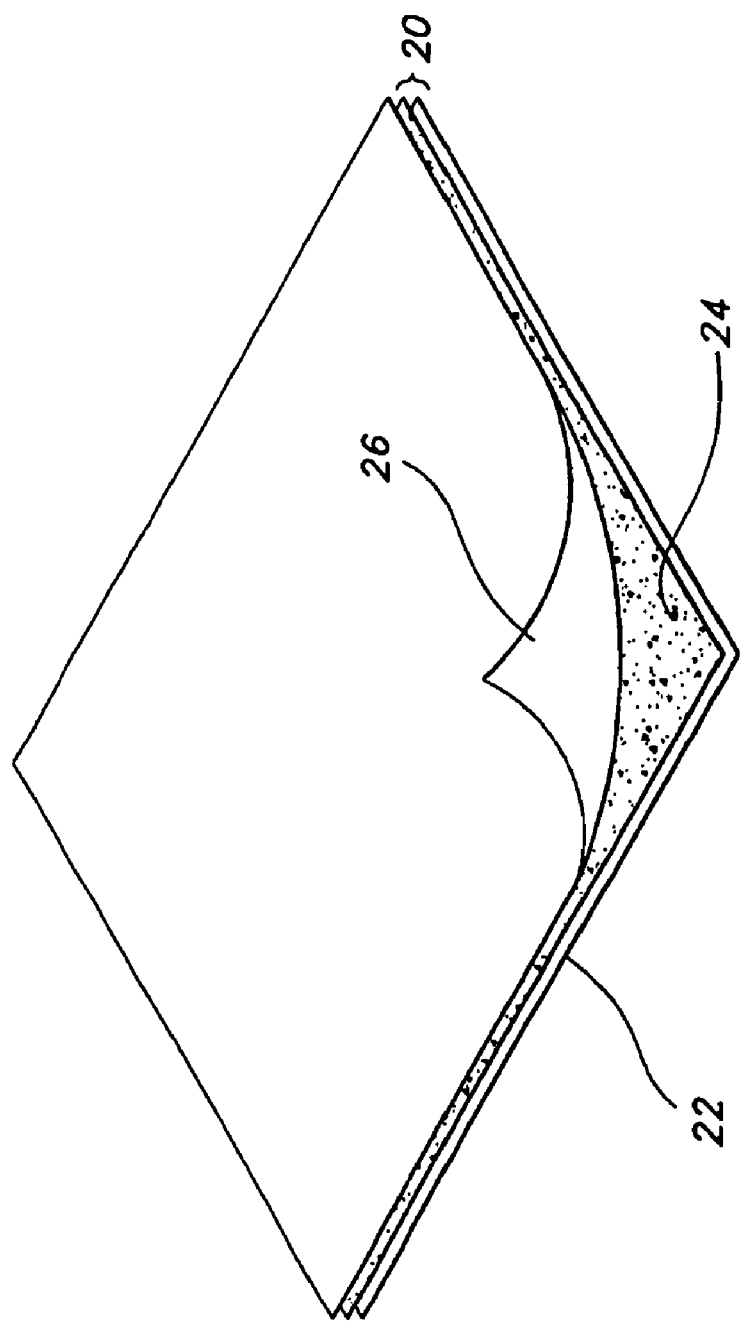
FIG. 1 is perspective view of one embodiment of a connector and release layer of this invention.

FIG. 1 illustrates one embodiment of a connector 20 of this invention. The connector 20 includes a film 22 and an adhesive layer 24 coated on one side of the film 22. A release layer 26 is placed on top of the adhesive layer 24 to protect the underlying adhesive. In use, the release layer 26 is removed from the connector 20 to expose the adhesive layer 24. As will be described in more detail below, the connector 20 is then positioned so that the adhesive layer 24 contacts the underside of adjacent tiles to span the adjacent edges of the tiles and thereby connect the tiles together to form a floor covering. In this way, the tiles are assembled on a underlying flooring surface without the need to attach them to the floor surface, so that the tiles create a floor covering that "floats" on the underlying floor surface.

The film 22 may be of any suitable material, but, to facilitate rapid flooring installations in accordance with this invention, is preferably made of a material that is relatively stiff so that a connector positioned partly in contact with the underside of a tile will project beyond the edge of the tile in roughly the same plane as the underside of the tile. This facilitates proper positioning of the projecting connector portion to make appropriate contact with an adjacent tile. This is typically greater stiffness than most adhesive tapes that will significantly curl or droop down from an underside of a tile to which a portion (but not all) of a length of such adhesive tape is attached. At the same time, the film 22 from which connectors of this invention are made should be sufficiently flexible to facilitate handling the connectors in a roll if desired and to permit the connectors to conform to floor or tile irregularities.

The film 22 should also resist shrinkage, which can result in buckling of adjacent tiles, and exhibit a relatively high tensile strength to resist stretching under foot traffic and rolling loads. For example, materials that exhibit a tensile strength between 160-270 mega Pascals ("MPa") in the machine direction and 165-210 MPa in the cross-machine direction have been found particularly suitable for this application. Moreover, the percentage by which the material may be elongated or stretched before breaking should also be relatively high to prevent connector breakage and failure when subjected to tensile stresses. For example, it is preferable, but not required, that the material used be capable of being stretched 120-200% of its machine direction dimension and 150-170% of its cross-machine direction dimension before breaking.

Polymeric materials, paperboard and other materials including textiles and metals that are suitably stiff, thin, strong, water-resistant and inexpensive may also be used for film 22. However, the film 22 is preferably a synthetic polymer material, such as a polyolefin, a polyamide, or a polyester, and more preferably polyethylene terephthalate ("PET") polyester. These materials are relatively cheap, will conform to the underlying floor in use, and will resist corrosion. While not necessary, it is preferable that the film material be recyclable.

The film 22 preferably has a thickness between 0.0005 and 0.015 inches, inclusive, and more preferably between 0.003 and 0.01 inches, inclusive, and even more preferably is 0.005 inches. The film 22 may also have, but does not have to have, a primer coat (not shown in the figures), such as a coating of acrylic, applied to the same side on which the adhesive layer 24 is to be applied to promote adhesion between the film 22 and the adhesive layer 24. The film 22 may be corona treated on one or both sides to increase surface tension and promote adhesion between the film 22 and the adhesive 24 without the use of adhesion promoting coatings.

The film 22 may be any shape, including, but not limited to, a circular shape or any rectilinear shape such as a square or triangular. A square shape is suitable for most installations. Moreover, the size of the film 22 can depend on the size of the tiles being installed. However, as a general rule, the surface area of the film 22 can be as little as 1%, and preferably between 2-5%, of the surface area of the tiles for which the connectors are intended to be installed. It has been found that a connector surface area over nine square inches does not meaningfully contribute to the stability of an installation of 18 inch square or 50 centimeter square tiles. Thus, connectors 20 desirably should be, but do not have to be, no larger than about three inches by three inches square to conserve materials and limit expense.

While the adhesive layer 24 can be any adhesive that exhibits certain attributes desirable for use in this invention, the specific type or amount of adhesive used in the connector may often depend on the tile with which the connector 20 is intended for use. Some carpet tiles have backings containing plasticizer to increase flexibility and/or change other characteristics of the backing. Plasticizer has a tendency to migrate and may migrate into certain connector adhesives. This migration may weaken the adhesive properties of the connectors making them less effective. Water-based adhesives (rather than solvent based adhesives) with little or no volatile organic content ("VOC") may be plasticizer resistant and are thus generally preferable in cases where plasticizer migration resistance is desirable (i.e., in installations of carpet tiles containing plasticizer). Acrylic adhesives, including those sold by 3M under the identification numbers 9465, 6032, 6035, and 6038, and in particular 9465 (which is primarily an acrylate terpolymer) and 6032 (a tackified acrylate copolymer), are suitable. Moreover, the adhesive 24 preferably, but not necessarily, is resistant to water and typical carpet cleaning detergents. It is also preferable to use a releasable adhesive.

The adhesive layer 24 in all connectors 20 should adhere well to the back of the tiles. However, the adhesion to the tile should not be so strong as to prevent removal and repositioning of the tile relative to the connector 20, if necessary. If the bond strength between the tile and the adhesive (i.e., the amount of force required to separate the adhesive layer 24 from the tile backing, which can be measured using the ASTM D-3330 test (commonly referred to as the "90 degree peel test")) is too strong, the adhesive layer 24 will peel from the film and remain with the tile, thereby destroying the connector. Thus, the bond strength between the adhesive layer 24 and the tile should not be stronger than that between the adhesive layer 24 and the film 24.

The bond strength is preferably between 5-100 ounces/inch, inclusive, at room temperature. The preferable bond strength may depend on the tile backing. For example, the bond strength between the adhesive and hardback tiles, such as, for example, those made from PVC, polyurethane, or polyolefin, is preferably about 50-70 ounces/inch. The bond strength between the adhesive and tiles having a textile backing, such as for example a woven polypropylene or felt backing, is preferably about 10-60 ounces/inch. Moreover, the bond strength between the adhesive and cushion back tiles is preferably about 40-60 ounces/inch, and the bond strength between the adhesive and bitumen backed tiles is preferably about 10-20 ounces/inch. It is preferable that the bond strength between a tile and the adhesive at elevated temperatures remain within +/−15% of the bond strength at room temperature.

The amount of adhesive (i.e., the thickness of the adhesive layer) provided on each connector 20 can depend both on the size of the connector 20 as well as the tile to be used with the connector 20. However, it is preferable that, while the amount of adhesive should enable the connector sufficiently to contact and engage the underside of the tile to achieve the bonding strengths set forth above, it should not be so much that the adhesive migrates beyond the interface of the connector 20 and tile to contact the underlying floor. In this way, the floor-covering installation will remain unsecured to the underlying floor to facilitate the eventual removal of the modular units. A connector 20 with an adhesive thickness about 0.0005-0.010 inches, and more preferably about 0.002-0.008 inches, has been found suitable for most applications.

For tiles having a woven or knitted textile backing, more adhesive will typically be necessary to penetrate the cavities formed in the backing and thereby provide sufficient interfacial contact between the tile and adhesive. Connectors having an adhesive layer 24 that is about 0.005-0.008 inches thick is preferable for tiles having textile backings. For tiles having a relatively flat or shallow embossed backing surface, such as hard back tiles, less adhesive, preferably with a thickness in the range of 0.002-0.003 inches, may be used.

All of the adhesives contemplated for use on the connectors should also have sufficient sheer strength to prevent the tiles from moving relative to the connectors or each other and thereby creating gaps between adjacent tiles after installation.

Although not shown in the figures, it is possible to provide a logo or other design elements on the connectors 20. For example, a logo may be inked on the side of the film on which the adhesive is to be applied. In this way, the ink, which typically has a high VOC content, is trapped between the film and the adhesive, preventing any undesirable emissions from the ink. Moreover, when the connector is positioned on the release paper, the logo is also protected by the film. This prevents the logo from being accidentally scratched off or otherwise removed from the connector.

It may be useful to print or otherwise provide on the connectors alignment indicia (not shown in the figures) for facilitating installation of the tiles. The installer then need only align the tile edges (or other portions of the tiles) with the indicia to ensure that the connectors are optimally placed between adjacent tiles. Any indicia that would convey to the installer where the tiles should be placed on the connectors can be used. For example, connectors can be provided with crosshairs, divisional lines parallel and transverse to the edges of the connectors, dots, blocks, etc. Moreover, different portions of the connectors can be colored (such as by dividing the connectors into quadrants and imparting a different color to each quadrant) to indicate proper carpet tile positioning.

Chemical sensors may be placed on the connectors 20 to monitor the moisture content of the underlying floor. If the moisture content rises above a pre-determined level, the sensor transmits a wireless signal. In this way, the moisture content of the floor can be monitored and remedial measures specifically directed to the problem areas taken.

Moreover, pressure sensors may also be associated with the connectors 20. For example, if someone falls on the floor, the pressure sensor would alert a control system (such as via wireless signaling) that the pressure on a given area of the floor has exceeded the pre-determined level. The sensor thereby acts as a guide to the precise location of elevated pressure. Such technology could be particularly useful in homes for the aged or hospitals, where caregivers need constant assurance that their charges are safe (i.e., have not fallen and cannot get up).

In yet another embodiment, the connectors can be equipped as radio frequency identification ("RFID") tags by including radio frequency transponders. A radio frequency transponder is any kind of radio transmitter and/or receiver that is activated when it receives a radio frequency signal. The transponders can be incorporated within or otherwise attached to a connector in any manner. One or more transponders may be imprinted on one or more connectors used in an installation, as examples, a transponder could be imprinted on either side of the film or on an inlay that is attached to the film of a connector. It is not necessary, however, to have a transponder on every connector in an installation. Various configurations may be used including those depicted in the Figures.

Figure 21:
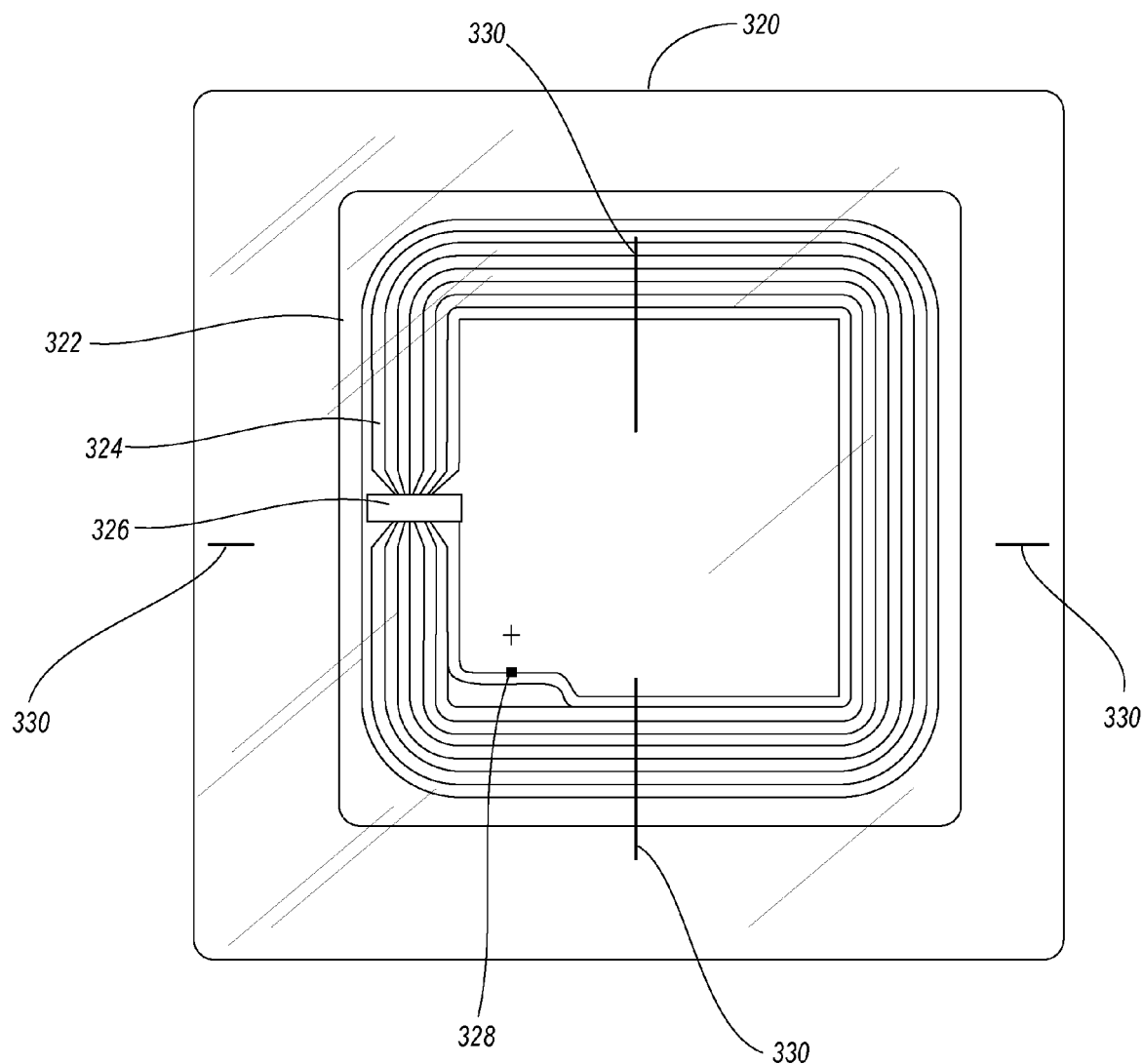
FIG. 21 is a top plan view of a radio frequency transponder embodiment of a connector.

FIG. 21 is a top plan view of a radio frequency transponder embodiment of a connector 320. The connector 320 may comprise a film with an adhesive layer that incorporates or otherwise attaches to a sheet 322 that contains or otherwise has one or more radio frequency transponders. Alternatively, the components of a transponder may be directly incorporated or otherwise attached on the connector film. In certain embodiments, a radio frequency transponder is attached to the connector film, meaning that the radio frequency transponder is directly or indirectly (e.g., as part of a sheet 322 or through any other intermediates) connected to or positioned adjacent to the connector film. The sheet 322 may further comprise a layer of adhesive or a face (paper or polymer) with a layer of adhesive. The radio frequency transponder comprises a coupling element 324 that is bonded to or otherwise used with an integrated circuit chip 328. The coupling element 324 may comprise a conductive material like copper or aluminum shaped as a coil or that otherwise acts as an antenna. The radio frequency transponder may also comprise a bridge 326 that connects the ends of the coupling element 324 to complete a loop and form a circuit. The integrated circuit chip 328 is an electronic microchip that may be readable and/or writable.

While FIG. 21 depicts a High Frequency ("HF") transponder incorporated in a connector 220, an ultra high frequency ("UHF") transponder or any other type of transponder could be used instead, for example, the connector 220 could comprise a transponder that has a single layer of conducting material or that extends from opposite sides of an integrated circuit chip to form shapes that are mirror images of each other. Radio transponder components may be inlayed, printed, or incorporated as part of a connector in any other manner. Radio transponder components may be passive, MEM passive, semi-active, active, or employ any other information technique. The components may or may not include batteries and/or software to control efficiency. One or more of the radio frequency transponder components may comprise metal, organic polymers, or any other material. Radio transponder components may include, but are not limited to, RFID components manufactured by Alien Technology Corporation, Avery Dennison Corporation, Texas Instruments Incorporated, Omron Corporation, and UPM Raflatac, among others.

Alignment indicia 330 (including, but not limited to, crosshairs, lines, dots, blocks, and multi-color segments and quadrants) may be provided on the connector 320 to provide guidance for an installer wishing to position the connector 320 at a corner or edge of a carpet tile. A connector may be positioned at a corner, at an edge, or simply on the back of a tile. In a multi-tile installation, some connectors may span the edges of adjacent tiles and others may simply be placed on the tile backs, i.e., each attaching to a single tile.

Connectors comprising radio frequency transponders offer RFID capability and may be positioned in any arrangement while installing a flooring surface. The connectors may be positioned to create an intelligent floor covering that has embedded components regularly spaced from one another. For example, the connectors may be regularly spaced, juxtaposed tile corners of the tiles, as shown in FIGS. 5, 6, 7, and 8. One benefit of certain embodiments is the creation of an array of regularly spaced radio frequency transponders that can send, store and/or receive information without requiring any additional installation beyond what is already required to use the connectors to secure the tiles. Such an array may be used to create a x-y grid or other map of the regularly arrayed components. For example, a robotic device may be moved over the grid to identify the relative positions of the tags to one another. These relative positions may used to map out the positions of the transponders in the array. A map may also be created if connectors are positioned irregularly. A map may be generated, for example, using a simulation localization and mapping ("SLAM") technique. In any case, such a map may be used with or incorporate a floor plan and/or a mapping program so that the radio transponder mapping can be used to identify the physical location of one or more radio transponder readers. As a radio transponder reader moves around, it can record the sequence of radio transponders it reads and send (for example, via wireless transmission) this information to a tracking station that monitors the real-time location of the equipment or person carrying the reader. In a multi connector installation, the radio frequency transponders of the different connectors may operate on the same or different frequency. For example, in one embodiment, the transponders in an installation range from low to high frequency. Information may be sent on different channels, each associated with a particular radio frequency transponder component. A radio frequency reader may further comprise a writer that sends information that is recorded on one or more of the radio frequency transponders. For example, it could send information identifying that vacuuming has occurred or the date that vacuuming has occurred. As another example, it could send position information relating to the relative or map position of the transponder receiving the information, e.g., x,y or x,y,z coordinates. This information could be provided when the transponder is read by other reading devices.

Generally, connectors equipped with radio transponders can facilitate a number of broad functions, including tracking, verification, tracing, positioning, and authenticating. By way only of example, connectors equipped with RFID technology can be used to locate the position of people, items, or equipment, for example tracking the location of a firefighter or firefighting equipment. They could also be used to track traffic patterns of people or equipment or to guide equipment to precise locations to perform specific functions.

In one application, the radio frequency transponders serve a mapping function to guide equipment equipped with a radio frequency component reader. For example, a reader can be placed on a vacuum cleaner or other cleaning machine. The reader may be programmed with a sequence of unique transponder numbers that are on the connectors in a room. When a robotic vacuum is so programmed and activated, the radio frequency transponders on the connectors in the room may be read by the robotic vacuum's reader and used to guide the vacuum towards the connectors in the order that the connectors' transponder numbers appear in a programmed sequence. In this way, the entire floor can be automatically cleaned or otherwise maintained. The transponder numbers of connectors positioned in higher traffic areas can appear more often in the sequence to ensure that those areas are cleaned more thoroughly. A variety of radio transponder readers may be used including readers offered by APSX, LLC® and Skyetek, Inc.®

In another embodiment, other types of robots are equipped with a reader. The reader can be programmed with a sequence of transponder numbers so as to lead the robot to various locations. For example, the reader on a robot in a hospital can be programmed to guide the robot along a designated path so that the robot can deliver medicines to rooms and perform other tasks. In addition to radio frequency transponder equipped connectors providing a map that a robot can follow to reach a desired location, the connectors can help to precisely position the robot (or other non-manually driven equipment). For example, if a robot needed to recharge at a power supply, a connector with a transponder could be positioned directly adjacent the power supply. In this way, the connector would guide the robot to and properly position the robot relative to the power supply for recharging.

In another embodiment, a shopping cart may be equipped with a reader. The shopper may indicate the products desired, and the radio frequency transponders on the connectors lead the cart to the desired locations in the store. Reading devices can be used in a variety of other contexts, including but not limited to in shopping malls, museums, hospitals, entertainment venues, and in conjunction with or otherwise facilitating global positioning systems.

Transponders can also be used to monitor the location and/or movement of equipment. In one embodiment, hospital equipment is equipped with a reader. The location of each piece of equipment in the hospital can be determined when its reader reads a connector transponder number, which is different from the other connector transponder numbers. In another embodiment, movement of equipment, such as a vacuum, can be monitored to determine whether an area has been cleaned or not. For example, the reader on a vacuum (either manually or robotically driven) can either store (to be downloaded at a later time) or transmit (via wireless communication) to a control system the connector transponder numbers that it reads in a room. If a transponder number on a connector in the room is not read, then the vacuum obviously did not clean in the vicinity of the connector. In this way, information about the cleaning, history of a room can be recorded.

In a similar manner, the transponders on the connectors and transponder readers on shopping carts and/or baskets can be used to gather information about traffic flow in a store. In this way, information about where people go in the store, how long they stay in certain areas, etc. is gathered and can be used for a variety of purposes, including designing the store layout to better accommodate traffic flows and customer demand. Similarly, a reader equipped shopping cart could include a display that presents advertisements and other information to the shoppers based on the areas where they are, where they have gone, and/or the areas they have lingered.

A radio frequency transponder equipped flooring surface provides a variety of potential benefits. In addition to facilitating maintenance monitoring, equipment and person locating, and robotic navigation, among the other things described herein, it may be used to provide additional safety and security benefits in a home, workplace, or other facility.

A radio frequency transponder and/or other RFID components may be imprinted directly on or as part of a modular tile, for example RFID components made of metal, polymer, organic polymer, or any other material could be directly printed on the back surface of modular tiles or any other component material. In one embodiment, radio frequency transponders are imprinted on one or more of the modular tiles near an edge or corner of each tile. When the tiles are installed, connectors may be positioned to adhere to the modular tiles in locations that covers or otherwise protect the radio frequency transponders.

A floorcovering installation may also be equipped with both sensors, such as chemical or pressure sensors, and radio frequency transponders. The sensors may record information to the radio transponders and the information may be harvested by a radio transponder reading device, for example as part of maintenance program. For example, a sensor may detect moisture content information and record that information at a nearby radio transponder. A connector can comprise one or more sensors and/or one or more radio transponder components.

Figure 1A:
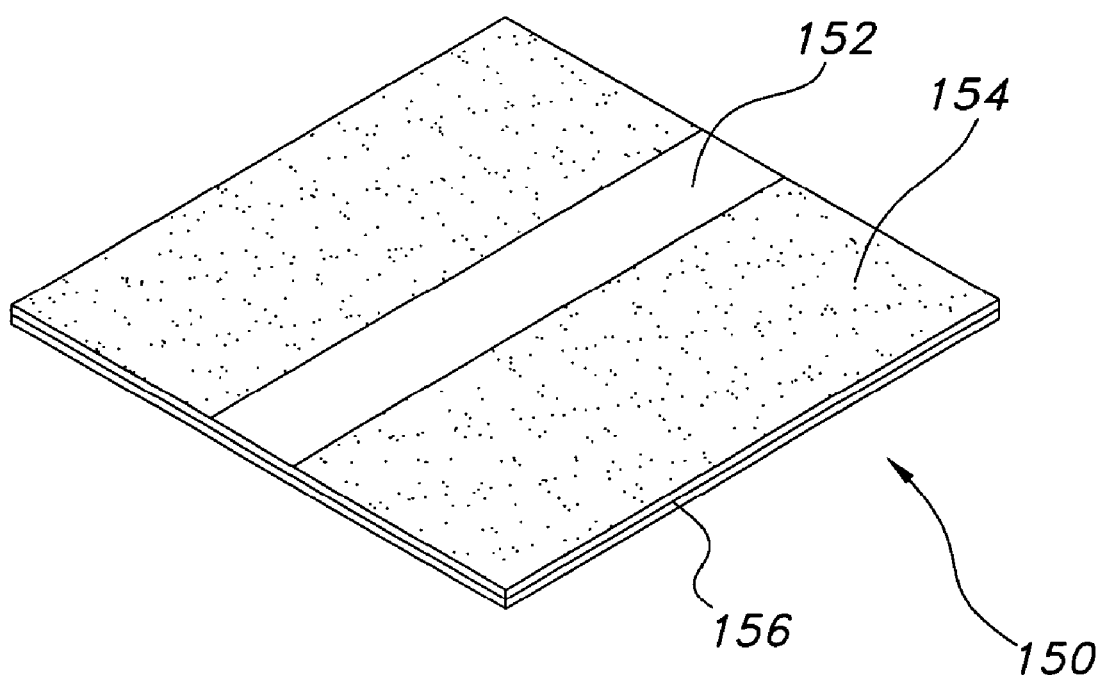
FIG. 1A is perspective view of one embodiment of a conductive connector.

FIG. 1A illustrates an embodiment of a connector having conductive properties (hereinafter referred to as a "conductive connector"). The entirety of this disclosure should be understood to apply to conductive connectors 150 as well as connectors 20.

As with the connector 20 described above, the conductive connector 150 includes a film 156 and an adhesive layer 154 on one side of the film 156. The conductive connector 150 additionally includes a conductive component 152 secured to the film 15. For example, the conductive component 152 may be secured to the film 15 with adhesive. Alternatively, the conductive component 152 may be secured to the film 15 using any converting process, including, but not limited to, lamination, molding, ultrasonic welding, etc. In this particular embodiment, the conductive component 152 is a rectangular strip (e.g., 1 inch in width) of conductive material, such as copper foil, that runs across the width of the conductive connector 150. While this embodiment shows a rectangular conductive component 152 of copper foil positioned in the center of a conductive connector 150, one of skill in the art will understand that the conductive component can be made from any conductive material, can be of any shape and size, and can be positioned anywhere on the connector as long as, when positioned to connect adjacent tiles, electrical continuity can be maintained between adjacent tiles. Moreover, the conductive component could be on the adhesive side 154 of the film 156 as shown, or on the opposite side (provided means for ensuring conductivity between the underside of the tile and the conductive element are provided).

The conductive connectors 150 can be used to connect adjacent tiles together, as described above. Most carpet tiles contain conductive materials, such as inorganic fillers like carbon, calcium oxide, calcium carbonate, barium sulfate, etc. Thus, when a conductive connector 150 is used to secure adjacent tiles together such that the conductive component 152 contacts both tiles, an avenue is provided by which electricity can be transmitted across adjacent carpet tiles to form a conductive surface. The formation of a conductive surface allows for the transmission of electricity across the floor. This electricity can be harnessed for a variety of applications.

For example, in one embodiment, the conductive connector 150 can be an electromechanical film made of a piezoelectric material that produces an electric charge when pressure is exerted on it (i.e., when someone is walking on the tiles). A device can then receive and process the emitted signal and provide an alert to those monitoring the device that a person is walking on the tiles. This type of device has significance for security purposes and can enable, for example, the monitoring of access to a restricted room. Based on the signal that is produced when a person steps on the carpet tile, it is possible to identify who is walking on the carpet based on the person's gate. The system can then determine whether the person has access to the restricted area or if the person is an intruder. Moreover, because walking on the carpet tiles generates electricity, it is contemplated that such electricity can be harnessed and used to meet a building's energy needs. It is conceivable that a building Could eventually become self-sustaining in terms of its energy needs using this technology.

In another embodiment, the conductive connector 150 allows transmission of electricity across the floor for voice and data communication. When the entire floor surface is linked together in a conductive fashion, the conductive connectors can serve as an antenna for transmitting or receiving information. Alternatively, the conductive connectors can function as a shield to prevent stray wireless signals from entering or leaving an area.

Returning to FIG. 1, the release layer 26 may be any material compatible with the adhesive such that the release layer 26 does not adhere to the adhesive to prevent its removal from the connector. Kraft paper having a low energy coating, such as a polymer coating (e.g., polymeric silicone), on at least one side has been found to be particularly suitable in this application. However, release materials suitable for use in this invention are widely commercially available, such as from 3M, and readily known to one of ordinary skill in the art.

The connectors 20 are preferably provided to the installation site as individual units already entirely or partially cut into the desired shape and size to be used in the installation. While each connector 20 may be manufactured separately, economies of manufacture may be achieved by first manufacturing a sandwich of film 22, adhesive layer 24, release layer 26 larger than the intended connector size, and then cutting the connectors 20 from that sandwich. The adhesive layer 24 can be coated onto the desired film 22, after which the release layer 26 is positioned in contact with the adhesive layer 24 to form the sandwich. In another manufacturing embodiment, the adhesive layer 24 is first applied to the release layer 26, after which the film 22 is positioned onto the release layer 26 to form the sandwich.

The resulting sandwich may obviously then be cut into connectors 20 of the desired shape and size. However, a number of connectors 20 is preferably provided on a single release layer 26. For example, multiple pre-cut or perforated connectors 20 may be positioned consecutively along a strip of release layer 26. For ease of handling and storage, this strip can be rolled so that the connectors are positioned on the outside (see FIG. 2) or inside of the roll or folded between consecutive connectors 20 into an accordion shape. Moreover, a number of connectors 20 may be provided on a sheet of release layer 26. The film 22 may be provided with perforations 28 (see FIG. 3) or may be fully cut into the desired connector shape and size for ease of removal from the release layer 26 (not shown) during installation. The ideal number of connectors 20 provided on a strip or sheet of release material will obviously vary depending on the size of the installation.

Figure 2:
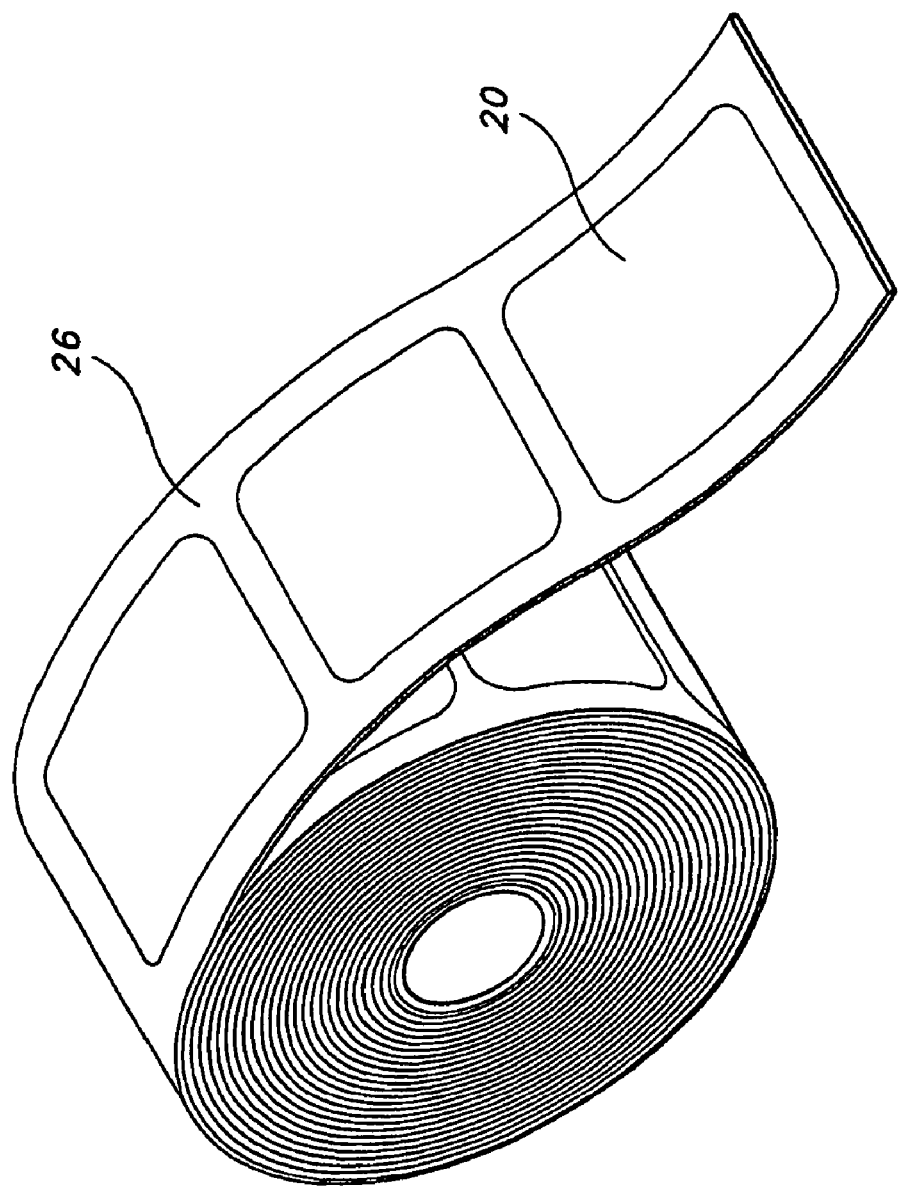
FIG. 2 is a perspective view of another embodiment of connectors and a release layer of this invention.
Figure 3:
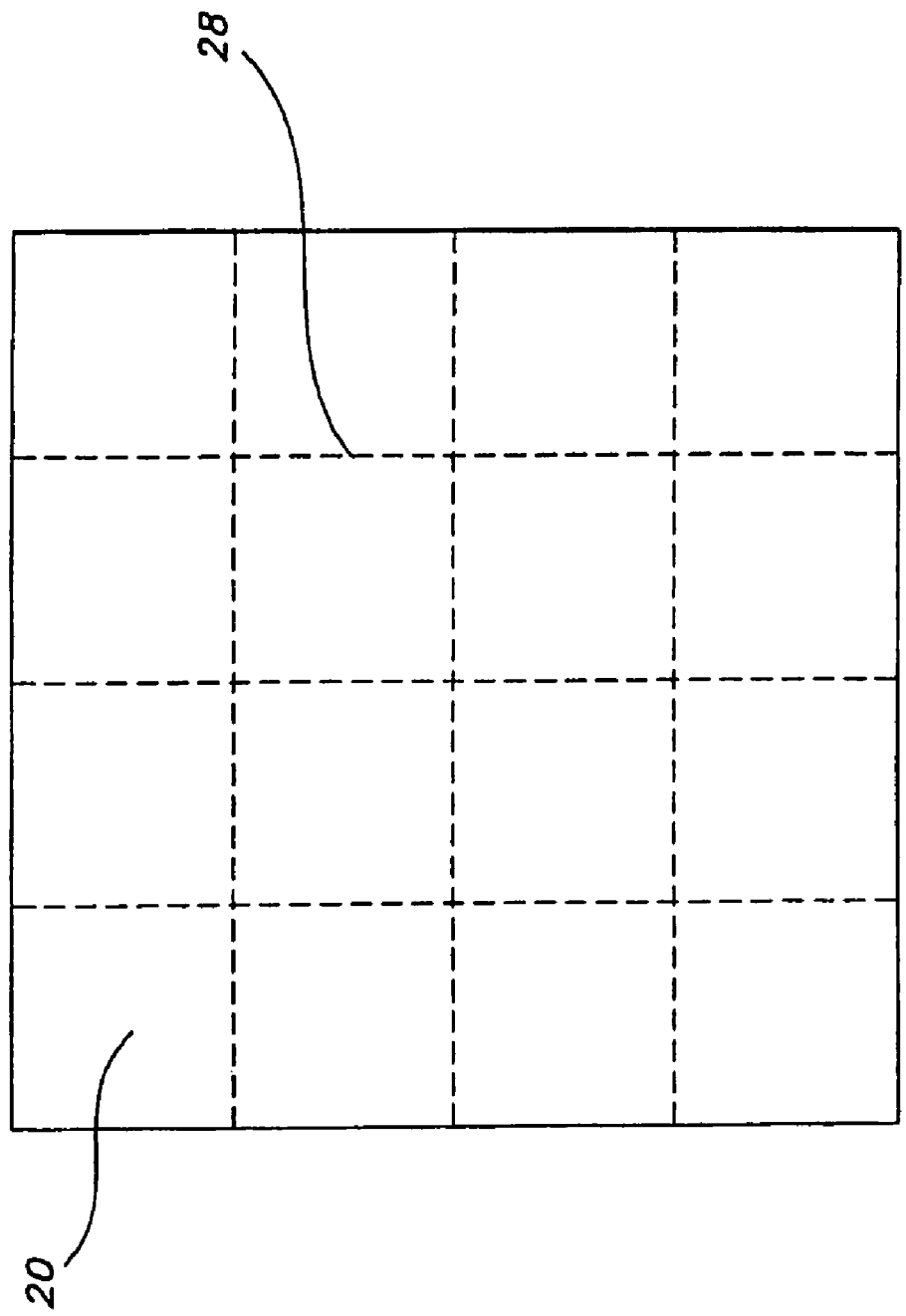
FIG. 3 is a top plan view of yet another embodiment of connectors of this invention.

Provision of the connectors 20 on a strip or sheet of release material has been found to facilitate removal of the connectors 20 from the release layer 26 and thus reduce installation time. With respect to connectors 20 provided on a strip of release material (as shown in FIG. 2), installation can also be expedited through use of a connector dispenser that holds at least one rolled or accordion folded strip of connectors 20 and that preferably also provides a mechanism for separating the connectors 20 from the release layer 26. The dispenser, which, for example, may be fashioned as a backpack or mounted on the installer's belt, preferably includes structure for supporting at least one roll of connectors 20 (and preferably more).

Figure 4:
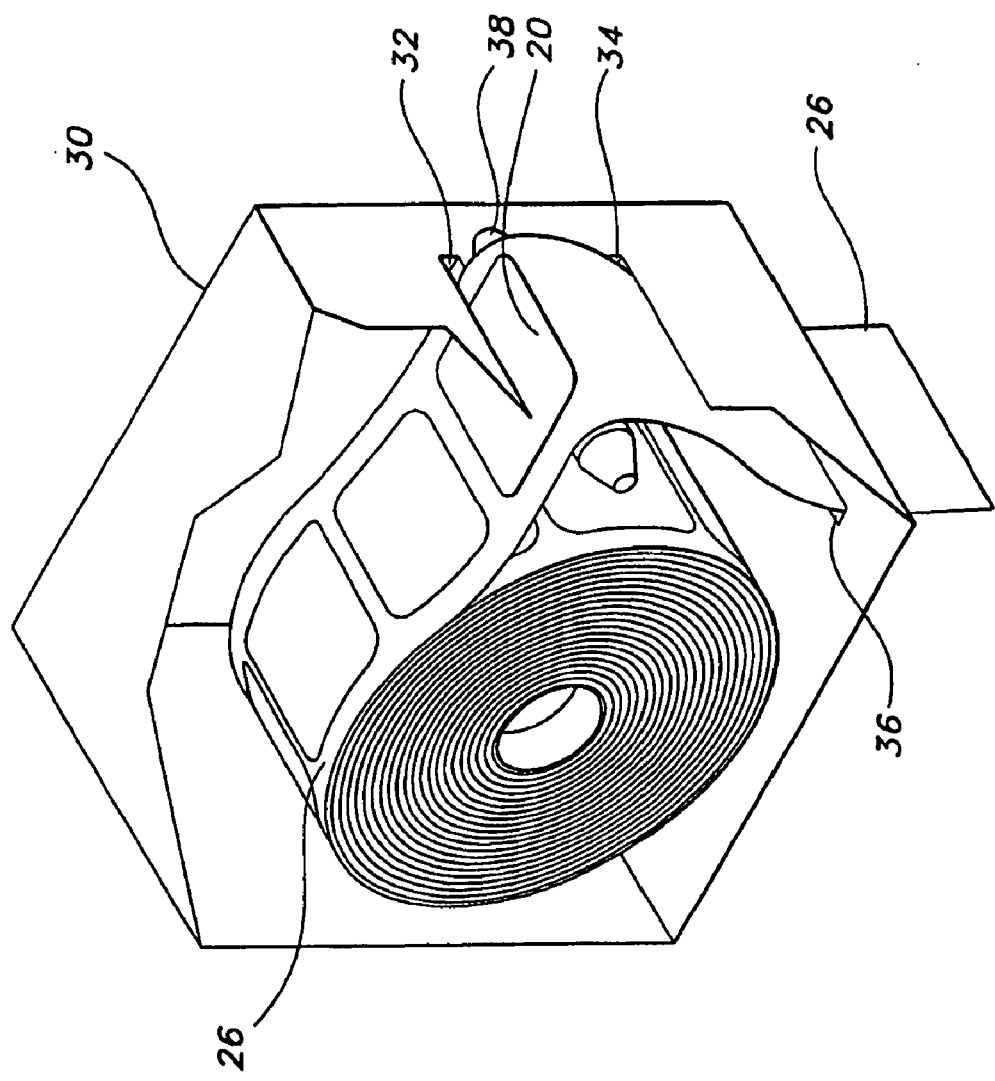
FIG. 4 is a schematic view of one embodiment of a connector dispenser of this invention.

In one embodiment of such a dispenser (see FIG. 4), a roll of release material bearing connectors 20 is housed in a box 30 made from any sufficiently-rigid material, such as, for example, plastic, metal, or cardboard. The box preferably includes three openings 32, 34, 36 through which the strip of release material is fed. The strip of release material is fed through the first opening 32, at which opening is positioned a projection 38. The release material is then fed back into the box 30 through a second opening 34 and out a third opening 36. In use, the installer pulls on the release material strip extending from the third opening 36. This, in turn, advances from the roll portions of the release layer 26 bearing connectors 20. As the release layer 26 extends over the projection 38, the connector 20, which is relatively rigid, is unable to conform to the shape of and travel over the projection 38. Instead, the connector's leading edge disengages from the release layer 26, after which the installer can easily grip the disengaged edge to remove the connector 20 fully from the release layer 26. Obviously, the more connectors the dispenser is able to support, the fewer times the installer must re-load the dispenser during installation. This can be especially beneficial during large installations.

In another embodiment of such a dispenser (see FIGS. 10-13), the dispenser 70 includes a housing 72 that holds connectors on a roll of release material 74. An actuator 76 is moved from an upper location or starting position down along the path of a slot 78 in the housing to trigger the release of a single connector from the roll of release material 74. The dispenser 70 separates a connector from a release material and produces an individual connector in a ready-to-grasp fashion such that the user's exposure to the adhesive side of the connector is limited. Specifically, the housing 72 has an opening 80 for presenting connectors in a location near the final location of a user's hand after moving the actuator 76 along slot 78 to trigger the release of the connector. Thus, moving the actuator 76 from a starting position to a finishing position along the linear path of slot 78 causes an individual connector to be released (or partially released) from the release material and presented through the opening, 80 to the user in a convenient location for the user's hand to grasp. Once the user's hand releases the actuator 76, the actuator 76 returns to its starting position at the top of the slot 78. The starting position of the actuator 76 is preferably located in a convenient location for the user, such that when the dispenser 70 is attached to the user's anatomy the actuator 76 will be located convenient to the user's hand, limiting the amount of movement necessary for a user to grasp and move the actuator 76.

The dispenser 70 may be secured to the installer's belt with belt loop 82 and to the installer's leg with a strap (not shown) through openings 84 in a leg mount 86 attached to the housing 72. The leg mount 86 has a curved shape and is formed of a relatively flexible material (e.g., rubber) such that when a strap through openings 84 is tightened around an installer's leg, the leg mount 86 forms a cushion conforming to the shape of the leg between the leg and the housing 72. Alternatively, the leg mount 86 and housing 72 may be one piece. The dispenser may have a variety of attachment members (e.g., belt loops, openings for straps, straps, clips, etc.) for securing the dispenser to a user.

Figure 11:
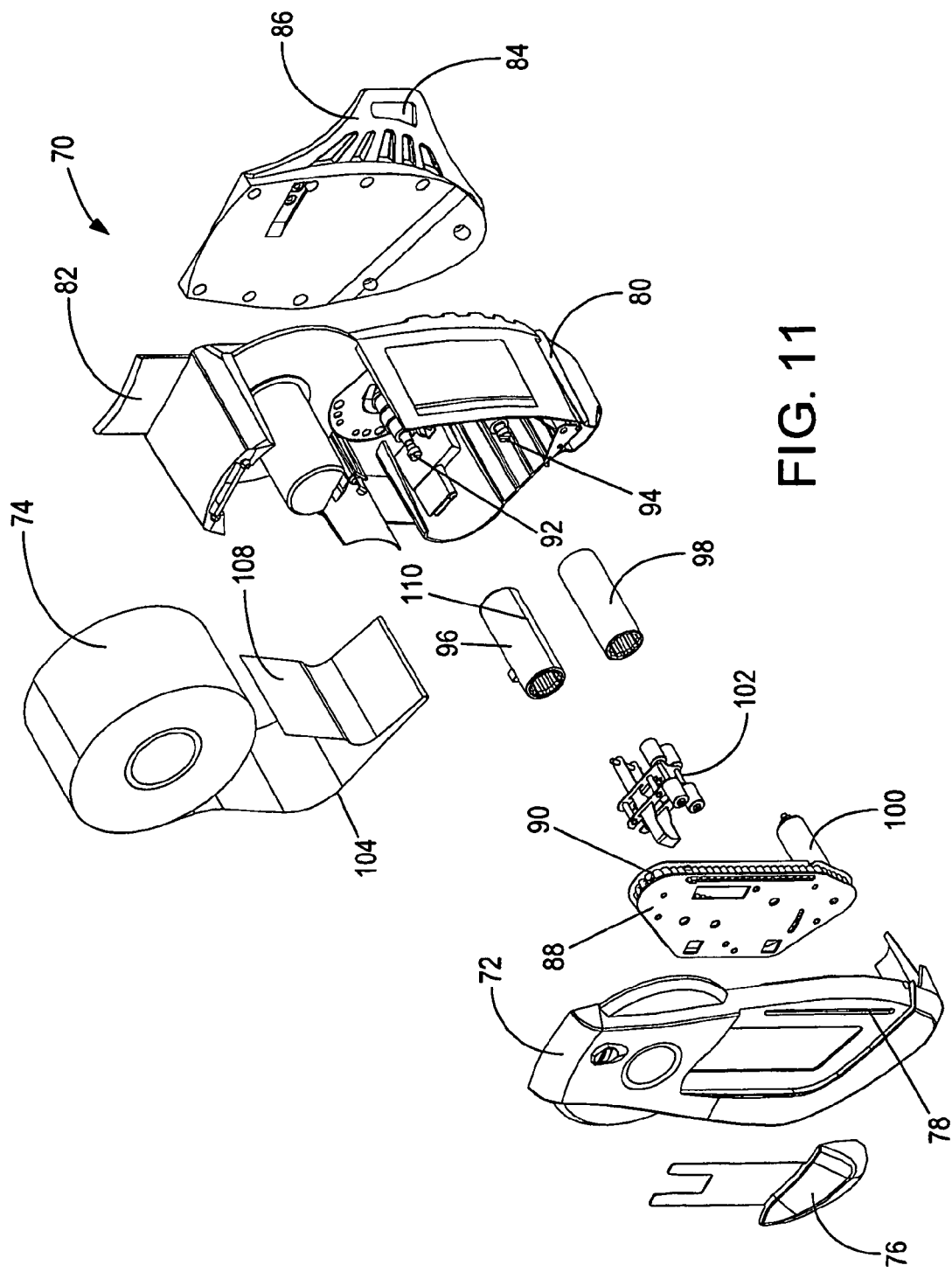
FIG. 11 is an exploded perspective view of the connector dispenser of FIG. 10.

FIG. 11 is an exploded perspective view of the connector dispenser 70. The drive pack 88 with rotating chain 90 is attached to a drive member (shown in FIGS. 14-15) that drives take-up roller 96 and a drive member (also shown in FIGS. 14-15) that drives meter roller 98. These rollers 96, 98 are also attached and rotate on take-up rod 92 and meter roller rod 94, respectively. One or both of these rods may use a ratcheted slip clutch to allow one to be overdriven with respect to the other. When assembled and in use, upon movement of the actuator 76 along slot 78, the rotating chain 90 of the drive pack 88 rotates and causes both take-up roller 96 and meter roller 98 to rotate. This causes the release layer 104 to travel around pin 116, which in turn causes the relatively flexible release material to bend around the curve of the pin 116 and the relatively stiff connectors to release from the release material and protrude through opening 80. Tensioning device or capstan assembly 102 fits adjacent to meter roller 98 when assembled. The tensioning device 102 is a pair of spring loaded rollers designed to push against meter roller 98 and in use keeps the release material 104 tightly up against meter roller 98.

The roll of release material 74 fits on spindle or peg 106 with the release material 104 extending to a tip portion 108. When the dispenser is assembled, the roll of release material 74 is loaded by inserting the roll 74 on peg 106 and feeding the release material 104 on an appropriate pathway through the dispenser 70 ending with tip 108 attached to take-up roller 96. Tip 108 may attach to take-up roller 96 by inserted tip 108 into slot 110 of take-up roller 96, using an adhesive on tip 108 to adhere the tip 108 to the perimeter of take-up roller 96, or by any other suitable technique.

When a roll 74 is properly inserted within a dispenser 70, a first connector on the roll 74 may be ready to be presented. This first connector may be spaced a predetermined distance from the tip 108, such that when the tip 108 is inserted in the slot 110 of take-up roller 96, the first connector is in an appropriate position. In other words, the first connector is positioned on the release material following a leader and tip 110 portion of predetermined length. Subsequent connectors are spaced along the release material 104 throughout the remainder of the roll 74. In most cases, the distance between connectors along the strip of release material will be relatively constant amongst the connectors.

After the actuator 74 causes the first connector to be presented from opening 80, the release material 104 has advanced so that the next connector is ready to be presented. Thus, the dispenser 70 is self aligning because movement of the actuator 74 will usually advance the release material 104 slightly more than the length of one connector putting the next connector to be presented in proper position. Adjustment screw 112 allows a user to fine tune or otherwise adjust the initial position of the actuator thus lengthening or shortening the distance the actuator is moved. This change is reflected in a change in the amount of release material 104 movement along the path when the actuator is moved from initial position to ending position.

Figure 13:
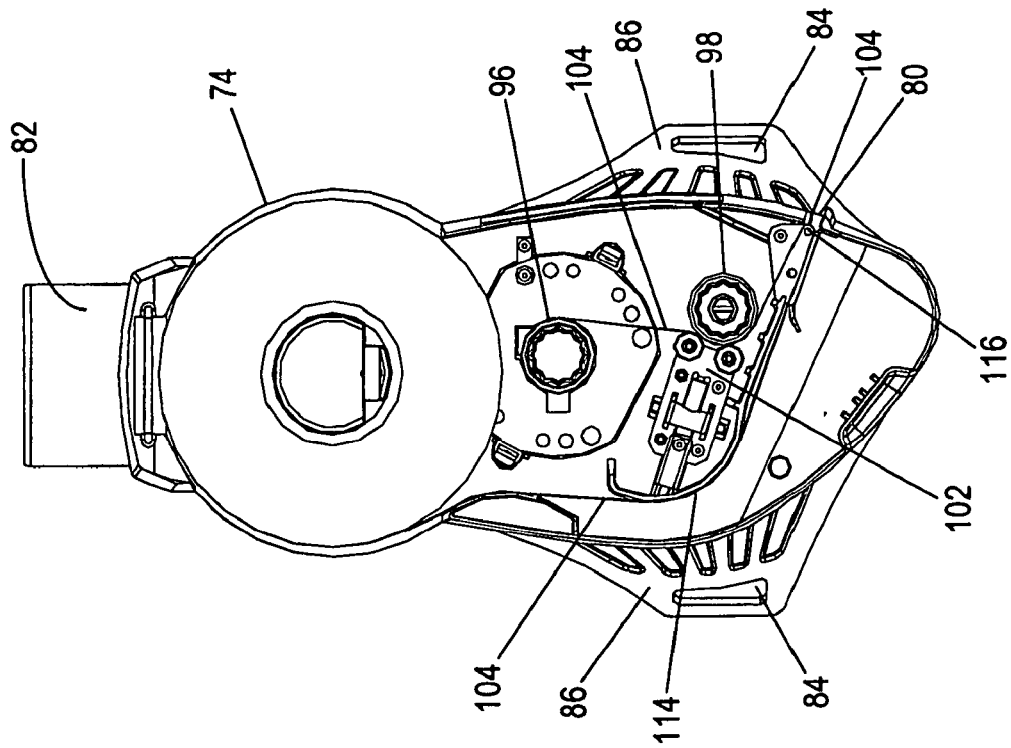
FIG. 13 is a side view of the connector dispenser of FIG. 10 with the front cover of the housing removed.

FIG. 13 is side view of the connector dispenser 70 with the cover removed that further illustrates the path of the release material 104. As shown, the path of the release material 104 begins at roll 74, extends along curved portion 114 to a sharp bend around free rotating rod 116 located near opening 80, extends between meter roller 98 and the tensioning device 102 up to the perimeter of take-up roller 96. In use, movement of the actuator 76 causes both the take-up roller 96 and the meter roller 98 to rotate predetermined amounts. This rotation, in turn, causes the release material 104 to advance a predetermined distance along the path described above. Generally, the release material will advance a sufficient distance to allow a connector on the release material 104 to detach or partially detach from the release material 104 and protrude from opening 80 for the user to grasp and use.

Figure 12:
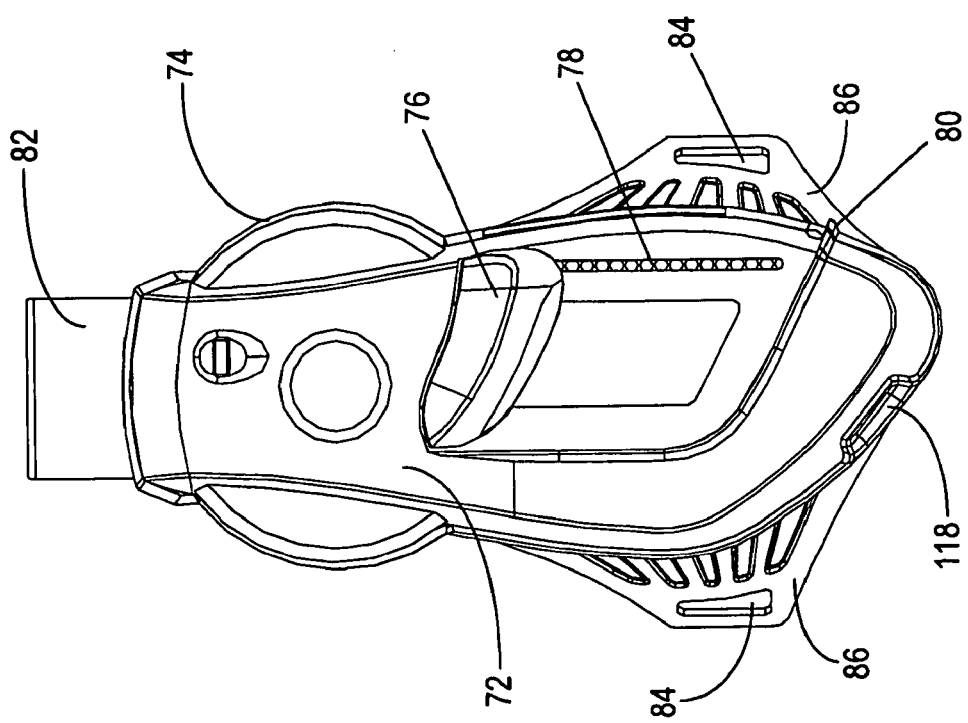
FIG. 12 is a side view of the connector dispenser of FIG. 10.

FIG. 12 is a side view of the connector dispenser 74 with the cover on. Generally, the dispenser housing will have two parts that allow the housing to be opened for loading and unloading of rolls of connectors on release material. The two parts may be connected together by a hinge and open in clamshell fashion. A latch 118 secures the two parts of the housing 72 together allowing a user to quickly and easily reload the dispenser 70 when needed. The positioning of the latch also allows a user to reload the dispenser 70 without detaching the dispenser 70 from its position on the user's body.

Figure 14:
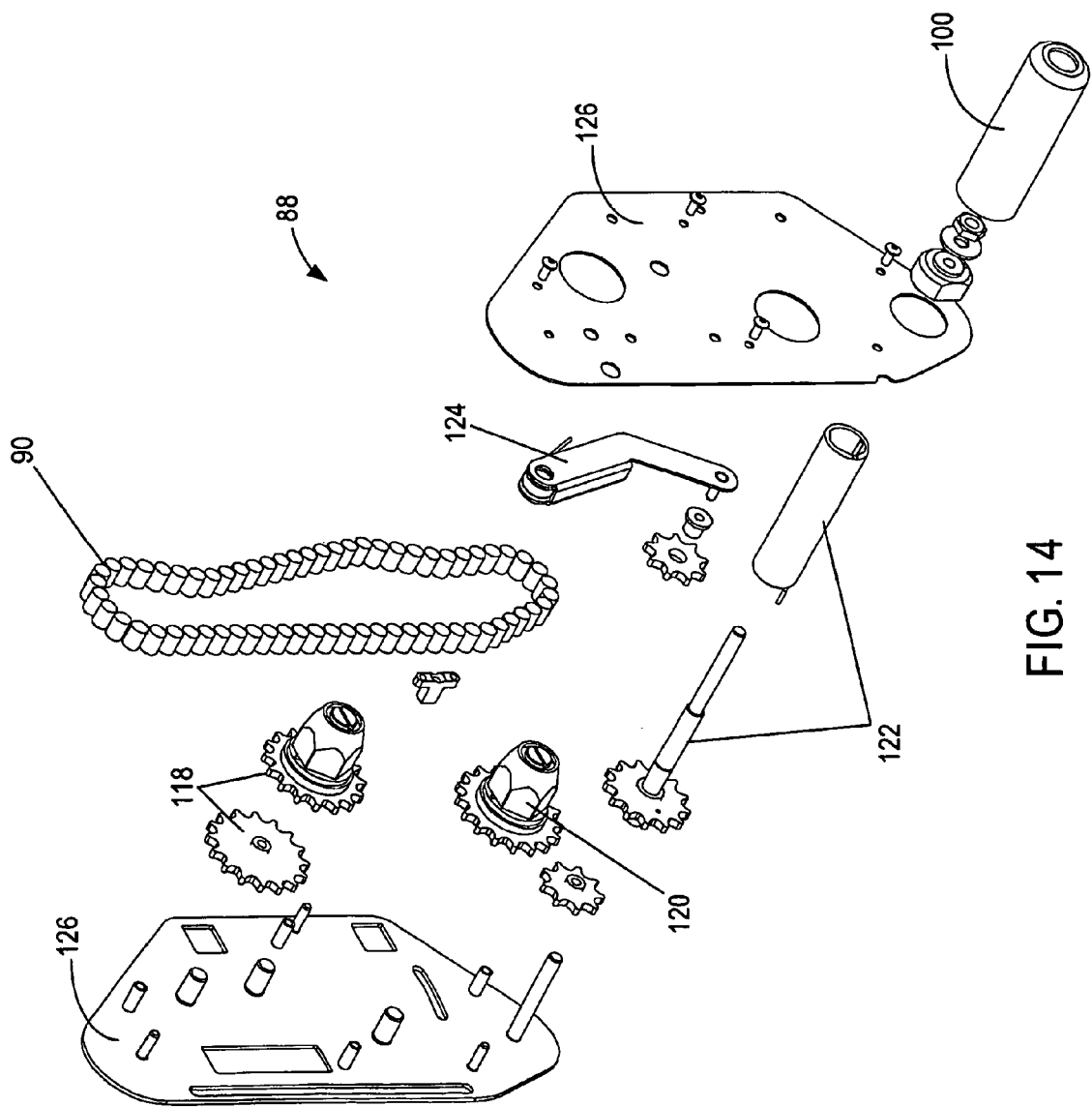
FIG. 14 is a side view of the drive pack of the connector dispenser of FIG. 10.
Figure 15:
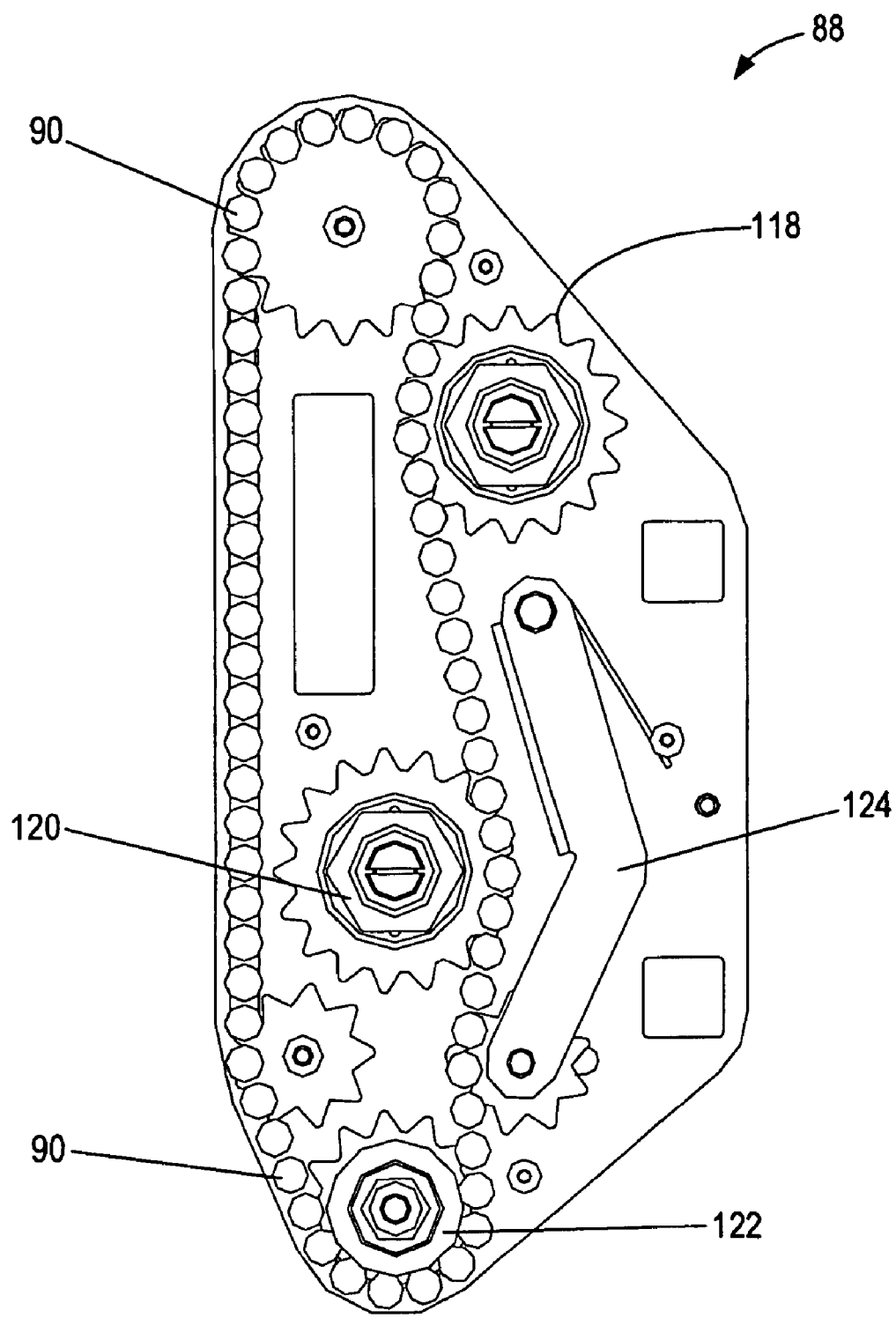
FIG. 15 is a front view of the drive pack of the connector dispenser of FIG. 10.

FIGS. 14 and 15 illustrate the drive pack 88 of the connector dispenser 70. The actuator of the 76 of the dispenser is attached to a link of the chain 90 within the drive pack 88 so that movement of the actuator 76 along actuator path 78 causes rotation of the chain 90 along its path within the drive pack 88. Rotation of the chain 90 in turn causes rotation of meter roller drive member 118 and take-up roll drive member 120. As described above, rotation of these drive members 118, 120 and their associated drive rollers 96, 98 causes the movement of the release material 104 within the dispenser 70. One or both of the drive members may utilize a ratcheting member to ensure that the drive member rotates only in one direction, i.e. the direction corresponding to forward movement of the release material 104 along its path within the dispenser 70. The drive members 118, 120 may attach to their respective rollers 96, 98 in any suitable way. For example, the drive members may have six point hex profiles that mate with twelve point hex sockets on the rollers. This six point to twelve point connection facilitates alignment of these components together during assembly or during repositioning of a cover of the dispenser 70 after reloading.

Also, as the chain moves with the movement of the actuator, spring drive members 122 rotate causing a spring (not shown) inside spring casing 100 to coil and retain energy. After the user moves the actuator 76 from its starting position to its finishing position and releases his hand from the actuator, the spring uncoils causing the chain 90 to rotate in the opposite direction and thus causing the attached actuator 76 to return to its starting position along path 78. Tensioning device 124 keeps the chain 90 secure in its path within drive pack 88. Casing 126 encases the internal parts of the drive pack 88.

Several alternative dispenser designs are possible. For instance, the dispenser may be altered for a variety of locations. In addition to being secured to a user's belt and leg, a dispenser may be strapped between the users knees, mounted to the user's arm or wrist, warn as a backpack, strapped across a user's shoulders, or attached to, secured to, hung off, or touching any suitable part of the user's anatomy. Typically, the location of the dispenser will provide the user convenient access to the connectors being dispensed.

Alternatively, the dispenser may be used separately from the user's anatomy. For example, the dispenser may rest on the floor or may be attached to a kneeler upon which the user kneels. The dispenser may hang from the ceiling or walls or may be attached to a zip line. The dispenser may also be part of or include some or all of the packaging in which the dispenser is shipped. As other alternative, the dispenser may dispense more than one connector at a time or may dispense a grid of connected dispensers.

The release of the connector from the release material may also be accomplished by alternative means than those described above. In addition to causing release by passing the release material around a sharp bend, a variety of other mechanisms are contemplated. For example, release may be triggered by the user grasping a connector and removing it from the release material. In such cases the dispenser may dispense the release material with the connector attached for the user to remove. For example, the dispenser may contain a stack of fan folded release material having one connector on each folded portion. An opening in such a dispenser allows a user to grasp and remove release material containing a connector and then remove the connector and discard the release material.

As another example, a dispenser may have a continuous roll of connectors without any release material. Such a dispenser may have cutting member near the opening to break-of a predetermined or user-determined amount of the connector roll for use as an individual connector. The backing of a roll of connectors that is rolled without release material as a backing may have a release coating.

As another example, connectors may be stacked within a dispenser individually, such that each connector has release material covering all or a portion of its adhesive side, so that it will not stick to the other connectors in the stack. The release material may have a weak adhesive on it so that the adjacent connectors in the stack are held together in a stack (i.e. the weak adhesive removeably sticks to the non-adhesive side of adjacent tiles).

As yet another alternative, the connectors may be stacked within the dispenser so that the adhesive side of each connector attaches to the adjacent connector. For example, a siliconated or polyflorinated release coating such as an acrylic, polyolefin, polyamide, or polyester may be applied to the non-adhesive side of each tile so that the adhesive sides of adjacent tiles may be removeably attached to the non-adhesive sides.

Stacks of connectors may be used with or without a dispenser. In some cases, it may be convenient for an installer to simply hold a stack of connectors removing one connector at a time for use. The connectors in the stack may be attached in a variety of ways such as those described above.

A dispenser of the present invention may also be configured to dispense connectors directly onto the carpet tile without a user touching the connector. For example, the dispenser may have a corner into which a carpet tile corner may be placed. Once the carpet tile is in place, the dispenser is activated by the user or automatically by sensing the presence of the tile to dispense a connector on the tile corner. A similar design may be used to directly attach a connector to the edge (rather than corner) of a carpet tile. Alternatively, the dispenser may be designed to roll under a carpet tile corner as the carpet tile is resting on the floor. Once in the proper position, the dispenser dispenses a connector directly onto the carpet tile. The rolling action may also cause the dispenser to eject a connector.

The dispenser of the present invention may also be configured to advance release material holding connectors in a variety of ways. In addition to an actuator that the user controls, the advancement of the release material may be controlled by the user pulling on the release material, the user pulling on the connector, an electric motor, user motion (e.g., the user rocking side to side on a kneeler), or by any other suitable technique or device.

A dispenser according to the present invention will typically, but not always, dispense connectors in an orientation convenient to the user or carpet tile installer. Preferably, the connectors will be dispensed adhesive side up so that the user is not required to flip or rotate the connector before applying or positioning it. The dispenser may also have a counter and display for tracking and displaying the number of connectors remaining on the release material. The dispenser may have an opening so that a user can see the remaining connectors held within.

In another embodiment of this invention, the release material 26 may be omitted entirely. Rather, the connectors 20 can be stacked on top of each other, with the adhesive layer 24 of one connector 20 contacting the film 22 of the connector 20 positioned above it in the stack. The installer then simply peels a connector 20 from the stack during installation.

In one method of installing tiles using the connectors, a first tile is placed on the floor at a position determined by conventional tile installation methods. A connector 20 is peeled from the release layer 26 (or from a stack of connectors 20) and positioned so that the adhesive layer 24 faces upward away from the underlying floor. The connector 20 is positioned so that only a portion of the adhesive layer 24 adheres to the underside of the tile, leaving the remainder of the connector 20 extending from the underside of the tile. A tile or tiles are then positioned adjacent the first tile so that a portion of the connector 20 adheres to the adjacent tile(s). In this way, the connector spans the adjacent edge(s) of the adjacent tile(s).

Any number of connectors 20 may be used to connect adjacent tiles in an installation. However, to create a stable floor covering, the connectors need not be positioned along the entirety of the adjacent tile edges nor even across all adjacent tile edges. Rather, unlike adhesive tape that has been used to secure adjacent tiles together along the entirety of adjacent tile edges, the connectors 20 of this invention need only extend along a very limited length of the adjacent edges. For example, the tiles of a floor covering installation where only 5%-10% of adjacent tile edges are stabilized with connectors 20 have been found to exhibit planar stability (measured by the cupping and/or curling of the tiles) and dimensional stability (measured by the skewing of the tiles), as well as the ability to retain their relative positions in the installation when subjected to foot traffic, rolling traffic, and stresses applied during cleaning and maintenance.

Figure 5:
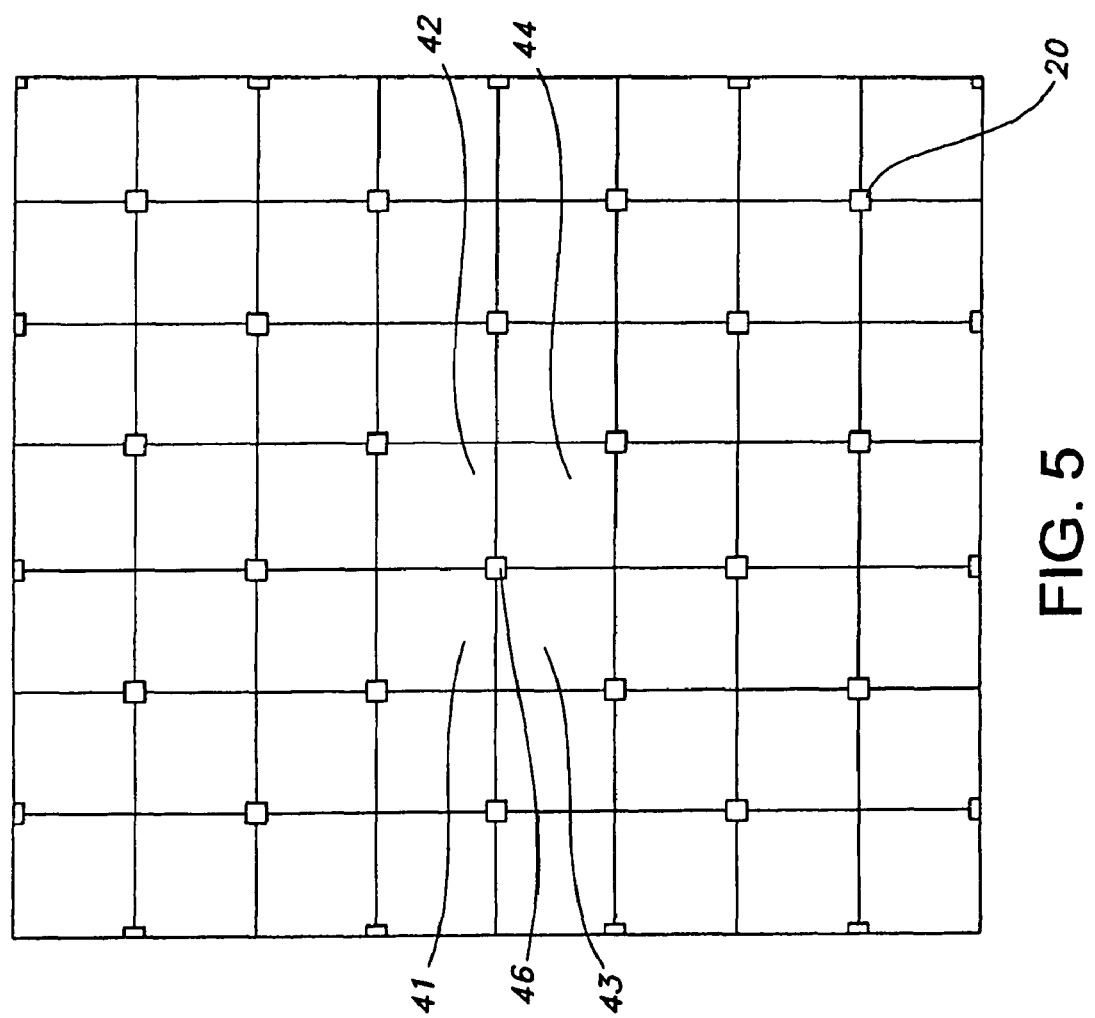
FIG. 5 is a bottom plan view of an installation of tiles pursuant to this invention.
Figure 6:
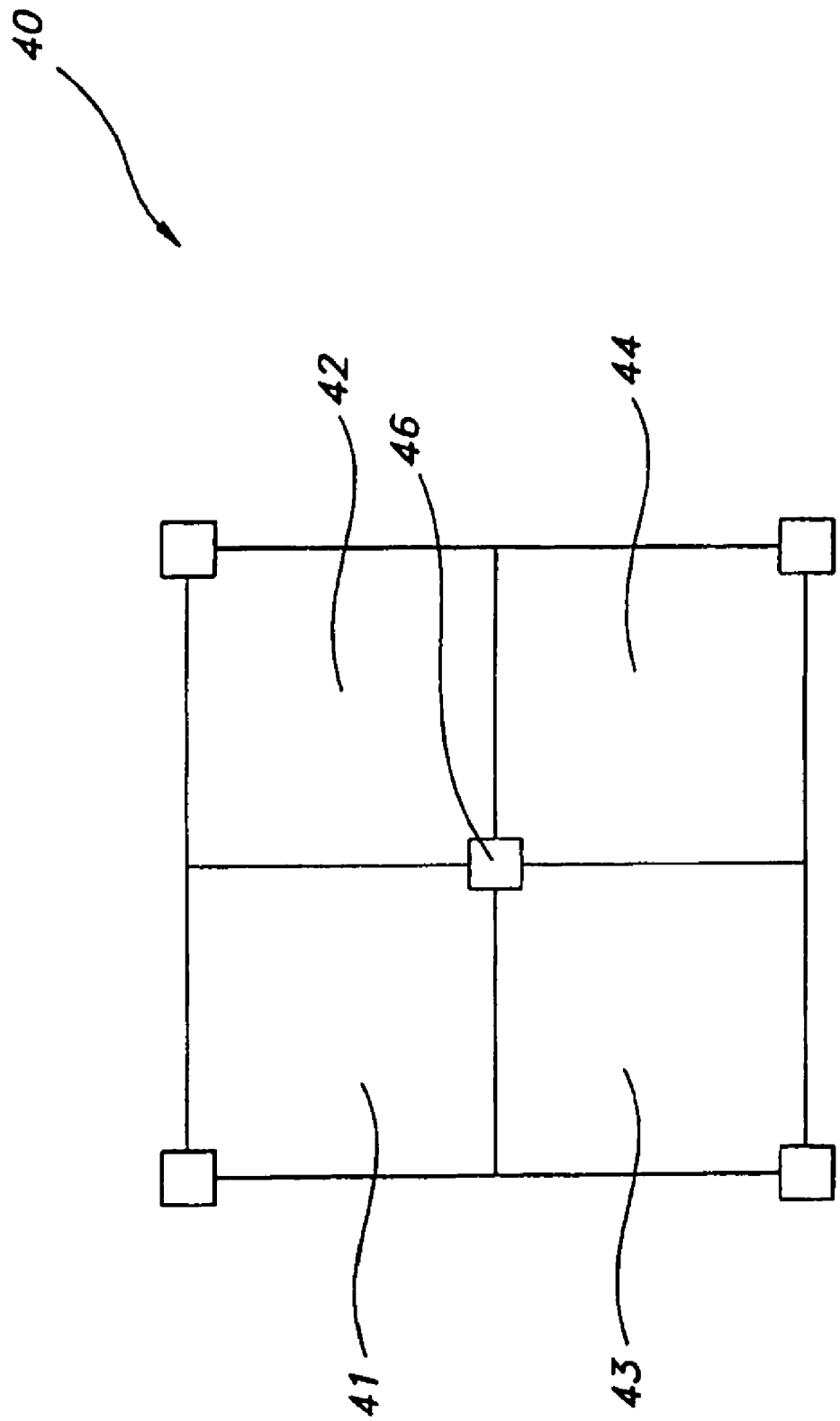
FIG. 6 is a bottom plan view of a subset of the tiles of FIG. 5.

FIG. 5 shows one embodiment of a conventional installation (i.e., in aligned columns and rows) of tiles. For ease of discussion, the positioning of the connectors is discussed relative to a basic unit 40 of four tiles 41-44, as shown and arranged in FIG. 6. Tiles 41-44 are preferably connected with a central connector 46 at the corners where they intersect. Moreover, the corner of each tile diagonal from the center connector 46 is also connected to adjacent tiles with a connector 20. In this way, only a total of two tile connectors (the center connector 46 plus a quarter of a connector at each of the four diagonal tile corners) need be used to install the basic unit 40 of four tiles 41-44. Breaking this down even further, each of the four tiles 41-44, draws its stability from, on average, only one half of the surface area of a connector.

Figure 7:
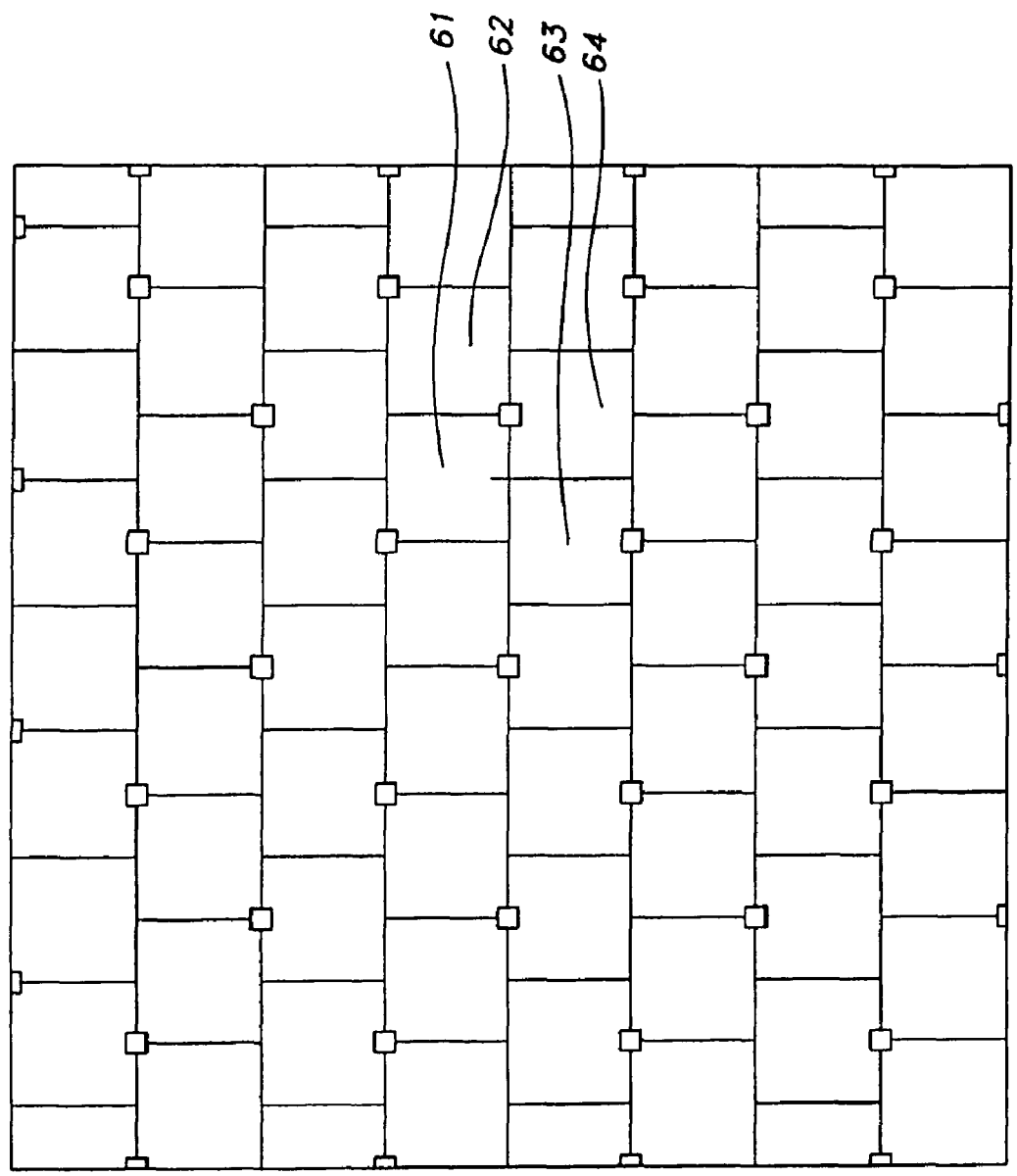
FIG. 7 is a bottom plan view of another installation of tiles pursuant to this invention.
Figure 8:
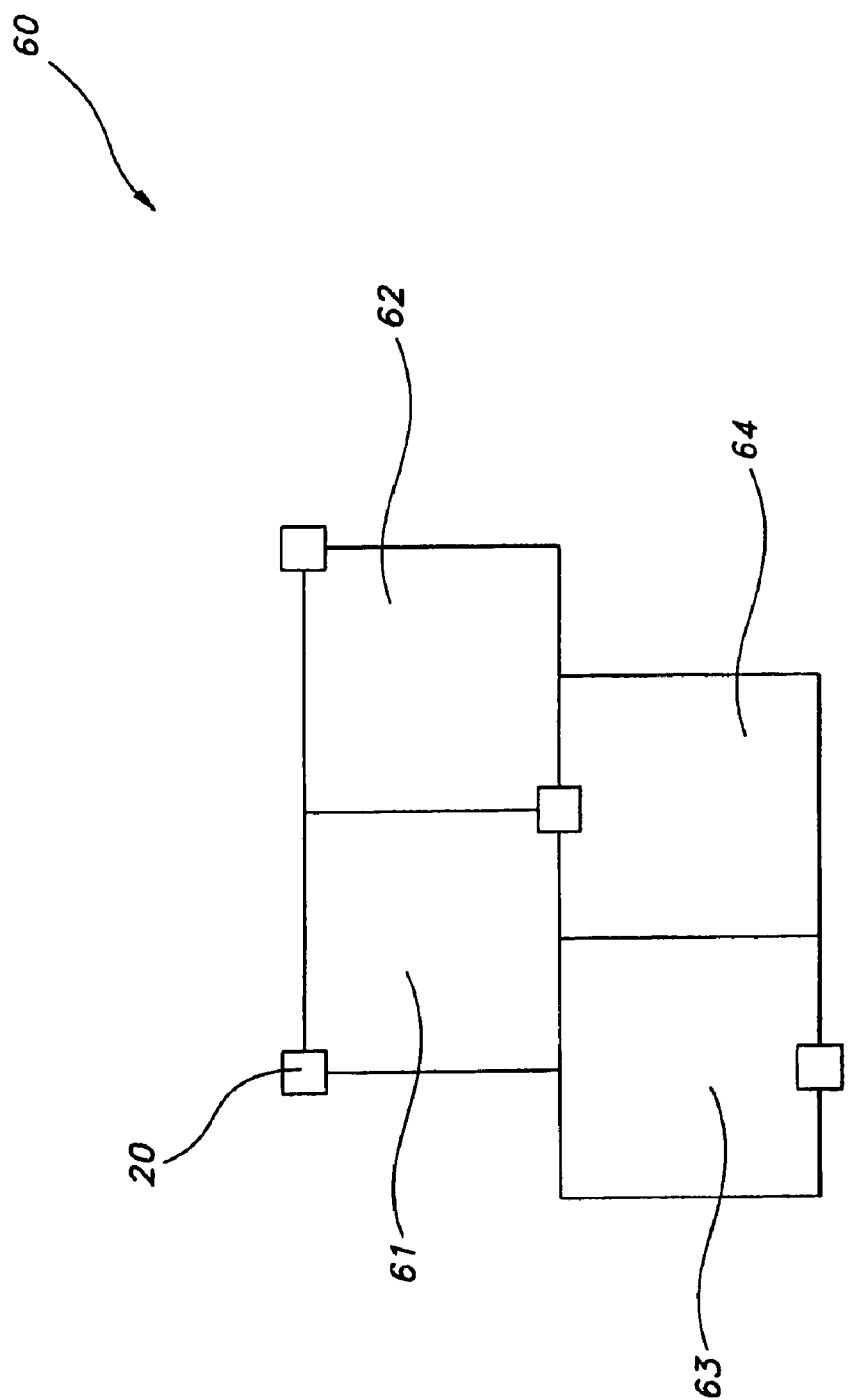
FIG. 8 is a bottom plan view of a subset of the tiles of FIG. 7.

FIG. 7 illustrates possible connector placement in a brick-laid tile installation (or ashlar installation if FIG. 7 is rotated ninety degrees). For ease of discussion, the preferable positioning of the connectors 20 is discussed relative to a basic unit 60 of four tiles 61-64, as shown and arranged in FIG. 8. As with tiles 41-44, a total of only two tile connectors (½ of a connector per each tile) need be used to install the basic unit 60 of four tiles 61-64.

FIGS. 5-8 illustrate a few of only countless connector placement possibilities for installing tiles. Connectors 20 may be positioned at any location between adjacent tiles, and thus any given tile in the installation may contact a portion of as few as one connector and as many as feasible given the size of the tile and of the connectors 20. In addition to placement at the corners of intersecting tiles, connectors 20 may be positioned to span the adjacent edges of only two tiles. Moreover, different shaped or sized connectors 20 may be useful in a single installation. For example, in addition to the rectangular connectors shown in FIG. 5, triangular-shaped connectors may be useful at the border of an installation, such as where the tiles abut a wall.

Figure 9:
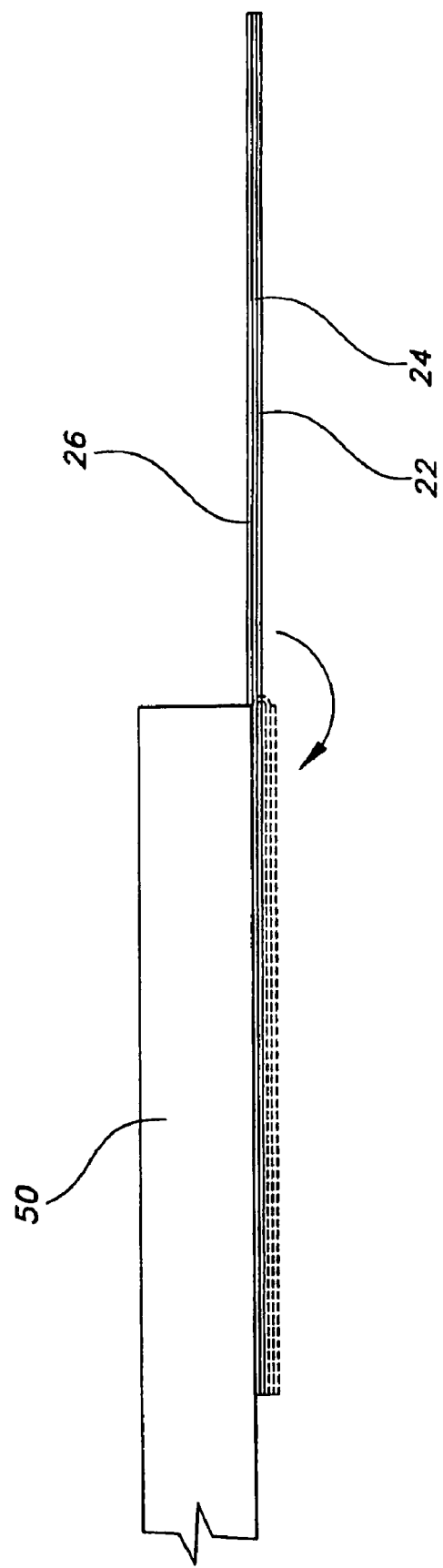
FIG. 9 is a side schematic view of an embodiment of a connector of this invention attached to a tile edge.
Figure 10:
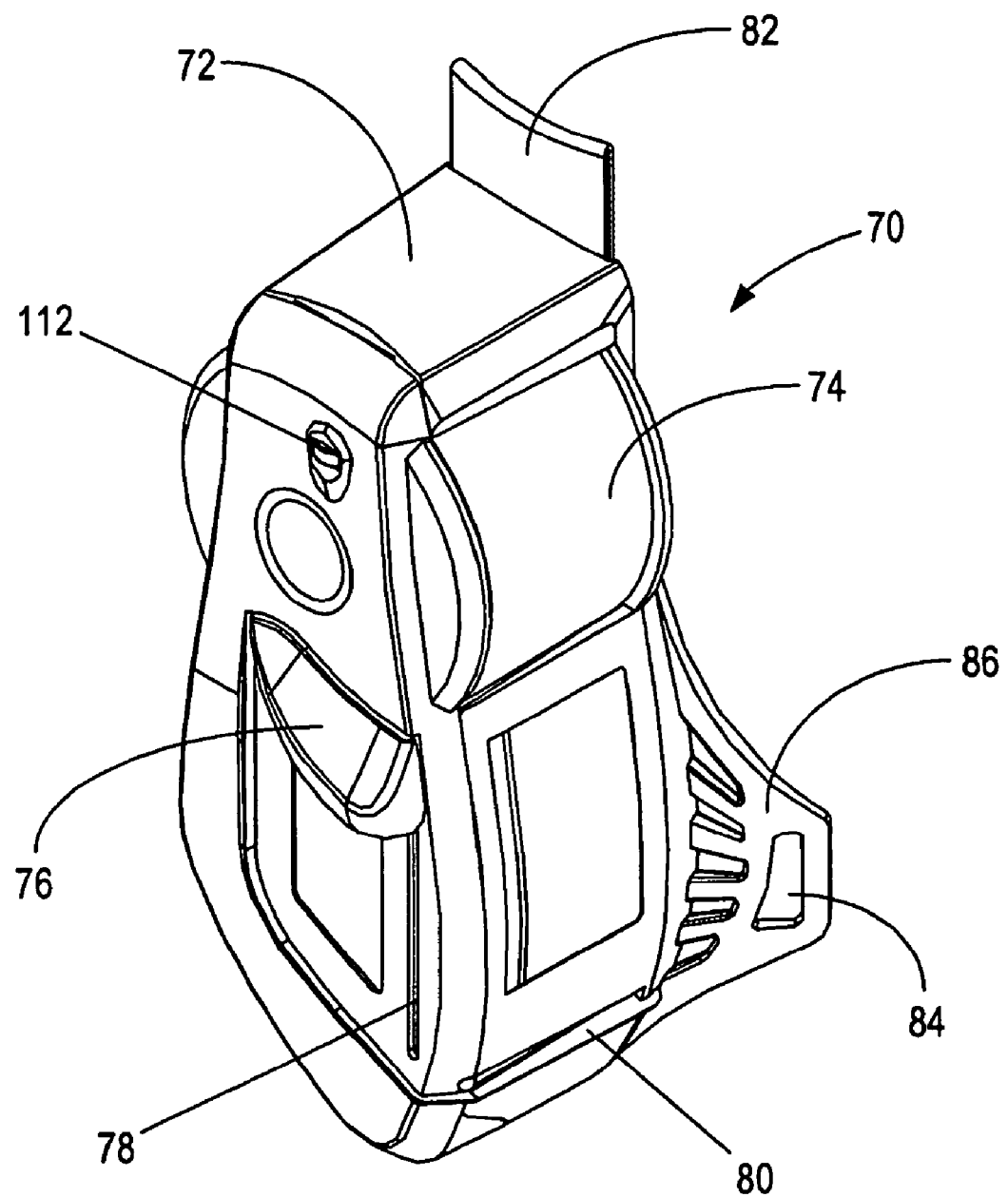
FIG. 10 is a perspective view of a connector dispenser.

In addition to on-site placement of the connectors 20, it is also possible to pre-position the connectors 20 at desired locations on the tiles during manufacture. For example, the release material 26 on the connectors 20 may be perforated. During manufacture, a portion of the release material 26 can thus be removed along the perforation to expose a portion of the adhesive layer 24. That portion of the connector 20 can then be adhered to the underside of the edge of a tile 50 as discussed above (see FIG. 9). The adhesive on the remainder of the connector 20 is still protected by the remaining release material 26. To prevent the connector 20, which extends from tile 50, from interfering with packaging of tile 50 for shipment, it may be preferable to bend the connector 20 along the perforation back (in direction A) so that the underside of the connector 20 is flush with itself. During installation, the installer need only extend the connector 20 from the edge of tile 50, remove the remaining release layer 26 and install the tiles 50 as discussed above.

Because the tiles are not attached to the floor, they need not be placed directly on an underlying flooring surface. Rather, the connectors 20 of this invention work equally well with tiles positioned on an intermediate substrate positioned between the tiles and the floor. Such intermediate substrates can serve to protect the floor from damage, such as might be caused by liquids spilled on the tiles that escape through the tile seams. Additionally, the intermediate substrates can serve as a barrier to moisture present in the existing floor and thereby eliminate the need for sealants and barrier coatings. Because the intermediate substrate does not need to be adhered to the flooring surface, it is removable with minimal cleanup and replacement cost.

Figure 16:
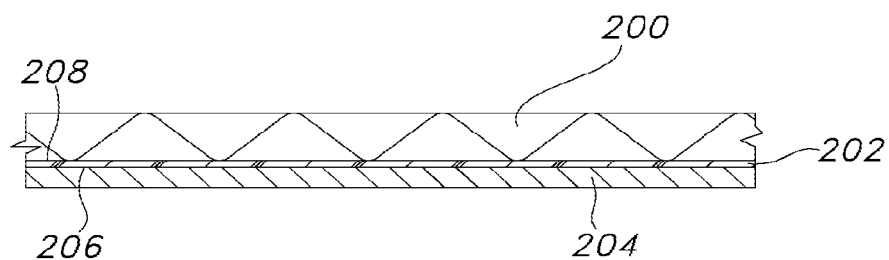
FIG. 16 is a cross-sectional view of an embodiment of a film positioned between a carpet tile and a flooring surface.

One embodiment of an intermediate substrate is a sheet or film 202 that may be positioned on the floor 206 prior to tile installation and thus between the floor 206 and the tiles 200, as shown in FIG. 16. The film 202 can be made from any suitable material and is preferably, but not necessarily, non-porous and non-permeable to moisture. In addition, the film 202 preferably is insensitive to highly alkaline conditions and preferably does not emit volatile organic compounds in excess of 350 micrograms/cm$^2$. The film 202 is preferably, but not necessarily, flexible to conform with irregularities in the floor 206. The film 202 can be made from any number of materials, including polymeric materials such as polyethylene, polypropylene, or PVC. A suitable film 202 can also contain, but is not limited to, certain polyolefins, polyesters, polyamides, and cellulose-based polymers.

Although the film 202 can be of any thickness, in one embodiment the thickness is between about $^1/_{1000}$ inch to about $^{40}/_{1000}$ inch and more preferably between about $^2/_{1000}$ inch to about $^{10}/_{1000}$ inch. Preferably, but not necessarily, the underlayment film has antimicrobial properties in its natural state, but if not, the film can be, but does not have to be, treated with antimicrobial chemical agents to prevent the growth of bacteria or other microbiological organisms. Additionally, the flammability of the underlayment film will preferably not have a negative effect on the flammability or smoke generating rating of the tile.

It may be desirable to increase the coefficient of friction on at least one side of the film 202 to impart anti-skid properties to the film 202. Preferably, but not necessarily, the coefficient of friction of at least one side of the film 202 is greater than 0.55. For example, a side of the film 202 may be manufactured from resin materials with tacky surface characteristics. For example, the film 202 can have a relatively smooth side (side 208 in FIG. 16) and an opposite side with a higher coefficient of friction (side 206 in FIG. 16). The film 202 can be positioned so that side 206 is positioned towards the floor 204. When so positioned, friction between the floor 204 and side 206 of the film 202 prevents the film 202 (and thus the carpet or carpet tiles positioned thereon) from moving relative to the floor 204, even with heavy foot traffic or other movement on the above-positioned tiles. While side 208 may also be provided with surface characteristics to increase its coefficient of friction, it is preferably relatively smooth so as to prevent the film 202 from sticking to the tile 200 or other underlayment.

In an alternative embodiment, an intermediate substrate between the tiles and the floor is a cushion or foam pad positioned on the floor before tile installation. The cushion provides comfort underfoot and can eliminate the need to use cushion back carpet tiles. Rather, hardback tiles can simply be installed on an underlying cushion pad. Additionally, the cushion serves as a barrier to moisture present in the existing floor.

The cushion can be made from any natural or synthetic material, or blends thereof, that provides a cushioning effect, such as compressive, resilient composites. For example, the cushion can be made from foam, rubber, cork, and woven, felted, and nonwoven fabrics. The cushion can be made from virgin or recycled polymeric material and is preferably, but not necessarily, made from 100% recycled materials. If the cushion underlayment is a foam material, the foam can be open or closed cell foam and can be made from any suitable polymer, including but not limited to, polyvinylchloride, polyurethane, and polyolefins. The woven, nonwoven, or felted cushions may be made from natural or synthetic materials, including, but not limited to, wool, cotton, flax, hemp, kenaf, sugarcane, and other naturally occurring cellulosic derivatives or polyamides, polyesters, polyolefins, and blends thereof. If non-woven, the cushion can be formed by needle punching with or without bonding agents or by a spun-bonding process. If woven, the cushion can be formed via weaving, knitting, etc. The cushion can be reinforced with fibers (e.g., fiberglass) for dimensional stability and added tear strength. While not necessary, the cushion preferably has the same characteristics as the film 202 (e.g., moisture resistant, low VOC content, conforms to floor, etc.)

Figure 17:
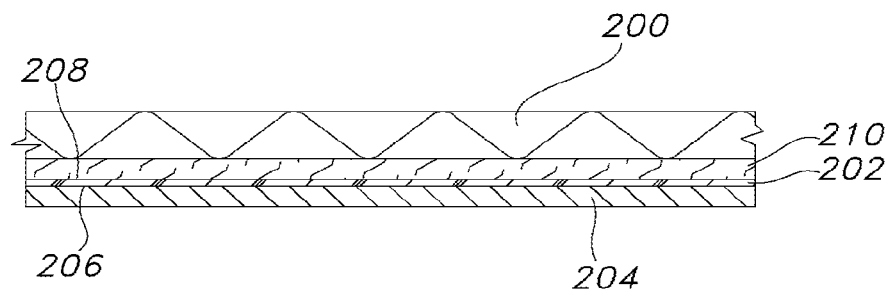
FIG. 17 is a cross-sectional view of an embodiment of a film and a cushion positioned between a carpet tile and a flooring surface.

Depending on the moisture resistant properties of the cushion, it may be desirable to install the cushion with the film 202. In the embodiment of FIG. 17, the film 202 is placed directly on the floor surface 204. A cushion 210 is then placed on top of the film 202 and the tile 200 is placed on top of the cushion 210. Adjacent tiles can be held in place using the connectors 20, which can optionally be conductive connectors 150, as described above.

Figure 18:
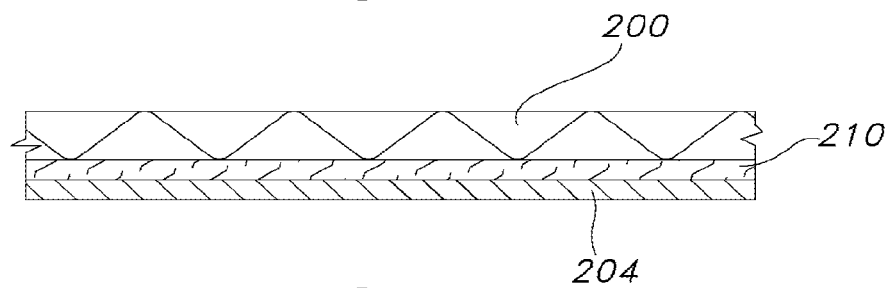
FIG. 18 is a cross-sectional view of an embodiment of a cushion positioned between a carpet tile and a flooring surface.

In another embodiment shown in FIG. 18, the cushion 210 is used without the film 202. In this embodiment, the cushion 210 is placed directly on the floor surface 204. The tile 200 is then placed on top of the cushion 210. Adjacent tiles then can be secured together with connectors 20 or conductive connectors 150, as described above. As with film 202, it may be desirable to impart a higher coefficient of friction to at least one side of the cushion 210 to prevent relative movement between the cushion and film (see FIG. 17) or cushion and floor (see FIG. 18).

The cushion 210 can be of any thickness. It is preferable, however, that the cushion's thickness does not exceed the thickness of the tile backing so that, when compressed, the cushion does not compress below the tile backing so as to cause a tripping hazard.

Regardless of the type of intermediate substrate used (if any), in one embodiment all of tiles placed atop the intermediate substrate are connected together using the connectors disclosed herein. In this way, none of the layers in the installation are connected to any other layer in the installation (e.g., the intermediate substrate is not connected to the floor and the carpeting or tiles are not connected of the intermediate substrate). In this way, the flooring may be easily removed without requiring clean-up and preparation before installation a subsequent floorcovering.

Yet another embodiment of an intermediate substrate is a cushion composite particularly well-suited for installing new carpet or carpet tiles over existing wall-to-wall carpeting or carpet tiles without having to remove the existing carpeting or carpet tiles.

Figure 19:
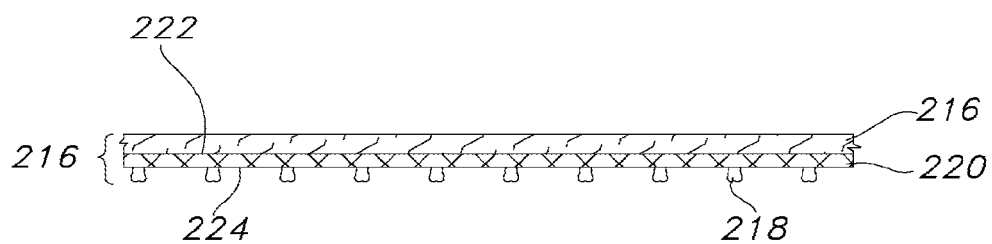
FIG. 19 is a cross-sectional view of an embodiment of a cushion composite of this invention.

One embodiment of a cushion composite 216 is illustrated in FIG. 19. In the embodiment shown in FIG. 19, the cushion composite 216 includes a semi-rigid layer 220 attached to a cushion 226. "Semi-rigid" means any structure that has some flexibility such that it can bend to some degree. Cushion 226 may have, but does not have to have, characteristics similar to those disclosed above relative to cushion 210. The semi-rigid layer 220 may be made out of any material. A synthetic polymeric material, such as polyolefin, polyamide, or polyester, may be particularly suitable in this application.

The semi-rigid layer 220 has a first side 222 and a second side 224. The second side 224 is provided with gripping components, such as teeth 218, that project from second side 224. While the teeth 218 are disclosed as being integrally-formed with the semi-rigid layer 220, they need not be. Rather, the gripping components may be fixed in any way (such as with adhesive, fasteners, clips, or any other chemical or mechanical fixation means) to the second side 224 of the semi-rigid layer 220.

The first side 222 is attached to cushion 226. If cushion 226 is pre-formed, the semi-rigid layer 220 can be molded onto the pre-formed cushion 226. Alternatively, if a foam material is used to make the cushion 226, the foam can be deposited directly onto the first side 222 of a pre-formed semi-rigid layer 220. Alternatively, the cushion 226 and semi-rigid layer 220 may each be pre-formed and subsequently adhered or otherwise affixed together.

Figure 20:
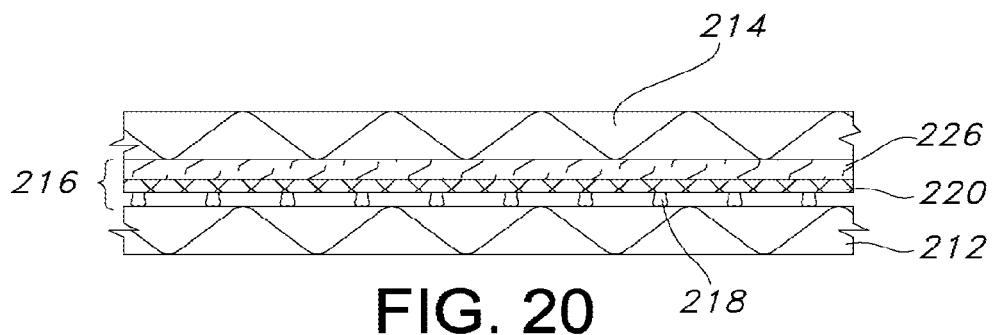
FIG. 20 is a cross-sectional view of the cushion composite of FIG. 19 positioned between existing carpet or tile and a new carpet or tile.

As shown in the embodiment of FIG. 20, the cushion composite 216 can be placed on top of existing carpet or tiles 212. Preferably, the cushion composite 216 is positioned so that the gripping components 218 penetrate into a portion of the existing carpet or tiles 212 to prevent relative movement between the cushion composite 216 and existing carpet or tile 212. The new carpet or carpet tile 214 is then placed on top of the cushion 226.

Use of the cushion composite 216 allows new carpet or carpet tile to be positioned over existing carpet or tiles without first removing the existing carpet or tiles. The new carpet tiles can then be secured together with the connectors 20 or conductive connectors 150, as described above. In the embodiment shown in FIG. 20, none of the layers (i.e., the existing carpet or tile 212, the cushion composite 216, and the new carpet or carpet tile 214) are affixed to each other. Thus, the installation of new tiles need not be permanent but rather can be easily removed. Moreover, the gripping components 218 are preferably, but not necessarily, designed so as not to damage the face of the existing carpet or tiles. Thus, an installation of new tiles can be removed without altering the appearance or usability of the existing carpet or tiles.

The connectors of this invention improve upon current tile installation systems and methods. The connectors use both less material and cheaper materials than traditional installation systems. Moreover, use of the connectors significantly reduces tile installation time (by as much as 60% of the time for adhesive systems) by obviating the need to prep a floor prior to installation. Rather than applying a layer of adhesive to the floor and then retracing his steps to position the tiles on the adhesive layer, with the connectors, the installer positions and secures as he goes. Moreover, given the releasable adhesive used on the connectors and the limited surface area of the tiles that contacts the connectors, the tiles can easily be repositioned if necessary. Furthermore, because the tiles do not interact with the underlying floor, they are easily removable from the floor and leave the underlying floor pristine upon such removal. Consequently, the floor does not require refinishing before it is recovered with another floorcovering.

The embodiment described above is illustrative and non-limiting. Many variations of the structures illustrated in the drawings and the materials described above are possible and within the scope of this invention as defined in the claims.

We claim:

1. A method of using radio frequency transponders in a floorcovering, the method comprising:
   forming a floorcovering by (a) positioning a plurality of tiles adjacent to one another on a flooring surface, each tile having an underside and edges; and (b) positioning connectors to span adjacent edges of at least some adjacent tiles, each connector comprising:
   (i) a film; (ii) and a radio frequency transponder; and (iii) an adhesive on a side of a film; wherein the adhesive contacts the undersides of the at least some adjacent tiles; and
   using a radio frequency reader to read one or more radio frequency transponders; and wherein the connectors form a grid.

2. The method of claim 1 further comprising identifying a location of each radio frequency transponders.

3. The method of claim 2 further comprising determining a radio frequency transponder map.

4. The method of claim 1, further comprising determining a position of a person or piece of equipment using the radio frequency reader.

5. The method of claim 1, further comprising tracking a movement of people or equipment using the radio frequency reader.

6. The method of claim 1, further comprising guiding a person or a piece of equipment to a location using the radio frequency reader.

7. The method of claim 1, wherein the radio frequency reader is placed on a cleaning machine.

8. The method of claim 7 wherein the radio frequency reader is programmed with a sequence of radio frequency transponder numbers and used to guide the cleaning machine in accordance with the sequence.

9. The method of claim 8 wherein the radio frequency transponder numbers corresponding to locations of higher traffic appear more often in the sequence than radio frequency transponder numbers corresponding to locations of lower traffic.

10. The method of claim 1 wherein the radio frequency reader is placed on a robot used for localization or navigation of equipment.

11. The method of claim 1 further comprising recording location history information about the radio frequency reader by recording radio frequency transponders read by the radio frequency reader.

12. The method of claim 11, wherein the radio frequency reader is used with a cleaning device and the location history information comprises a cleaning history information.

13. The method of claim 11, wherein the location history is stored at the radio frequency reader for later download to control system.

14. The method of claim 11, wherein the radio frequency reader transmits to a control system the connector radio frequency transponder that it reads.

15. The method of claim 1 further comprising recording location and time information for the radio frequency reader.

16. The method of claim 15 further comprising using the location and time information to determine information about traffic flow.

17. The method of claim 15 further comprising using the location and time information to determine how long a radio frequency reader was in an area.

* * * * *